United States Patent
Atkinson et al.

(10) Patent No.: US 6,367,012 B1
(45) Date of Patent: *Apr. 2, 2002

(54) EMBEDDING CERTIFICATIONS IN EXECUTABLE FILES FOR NETWORK TRANSMISSION

(75) Inventors: Robert G. Atkinson, Woodinville; James W. Kelly, Jr., Redmond; Bryan W. Tuttle, Newcastle; Robert M. Price, Seattle; Robert P. Reichel, Redmond, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/761,698

(22) Filed: Dec. 6, 1996

(51) Int. Cl.⁷ .............................. H04L 9/30; G06F 7/04
(52) U.S. Cl. ........................ 713/176; 713/167; 713/187
(58) Field of Search ................. 380/4, 25; 395/182.14; 713/200, 167, 175, 176, 187

(56) References Cited

U.S. PATENT DOCUMENTS

| | | | |
|---|---|---|---|
| 4,661,657 A | 4/1987 | Grenzebach et al. | 380/21 |
| 4,908,861 A | 3/1990 | Brachtl et al. | 380/25 |
| 5,050,212 A | 9/1991 | Dyson | 380/25 |
| 5,070,528 A | 12/1991 | Hawe et al. | 380/48 |
| 5,121,345 A | 6/1992 | Lentz | 364/550 |
| 5,214,700 A * | 5/1993 | Pinkas et al. | 380/25 |
| 5,343,527 A | 8/1994 | Moore | 380/4 |
| 5,349,642 A * | 9/1994 | Kingdon | 380/25 |
| 5,359,659 A | 10/1994 | Rosenthal | 380/4 |
| 5,367,573 A * | 11/1994 | Quimby | 380/25 |
| 5,390,247 A * | 2/1995 | Fischer | 380/25 |
| 5,412,717 A * | 5/1995 | Fischer | 380/4 |
| 5,473,691 A | 12/1995 | Menezes et al. | 380/25 |
| 5,475,826 A | 12/1995 | Fischer | 395/182.04 |
| 5,475,839 A | 12/1995 | Watson et al. | 395/650 |
| 5,495,533 A | 2/1996 | Linehan et al. | 380/21 |
| 5,692,047 A * | 11/1997 | McManis | 380/4 |

OTHER PUBLICATIONS

Bank, Joseph A. "Java Security", Dec. 12, 1995, [retrieved on Aug. 24, 1999]. Retrieved from the Internet:<http://swissnet.ai.mit.edu/~jbank/javapaper/javapaper.htnl/22 .*

* cited by examiner

Primary Examiner—Gilberto Barron, Jr.
(74) Attorney, Agent, or Firm—Klarquist Sparkman, LLP

(57) ABSTRACT

A certification or signature is incorporated in a computer program, an executable file, or code to assure its authenticity and integrity, particularly for receiving it over an open computer network like the Internet. The executable file may be of any executable form, including an executable or portable executable .exe file format, a .cab cabinet file format, an .ocx object control format, or a Java class file. The certification includes a keyed source confirmation with a secure representation of the executable file. In an embodiment, the certification is referenced in a header of the executable file, the reference including a pointer to the keyed source confirmation and an indication of the size of the keyed source confirmation.

28 Claims, 7 Drawing Sheets

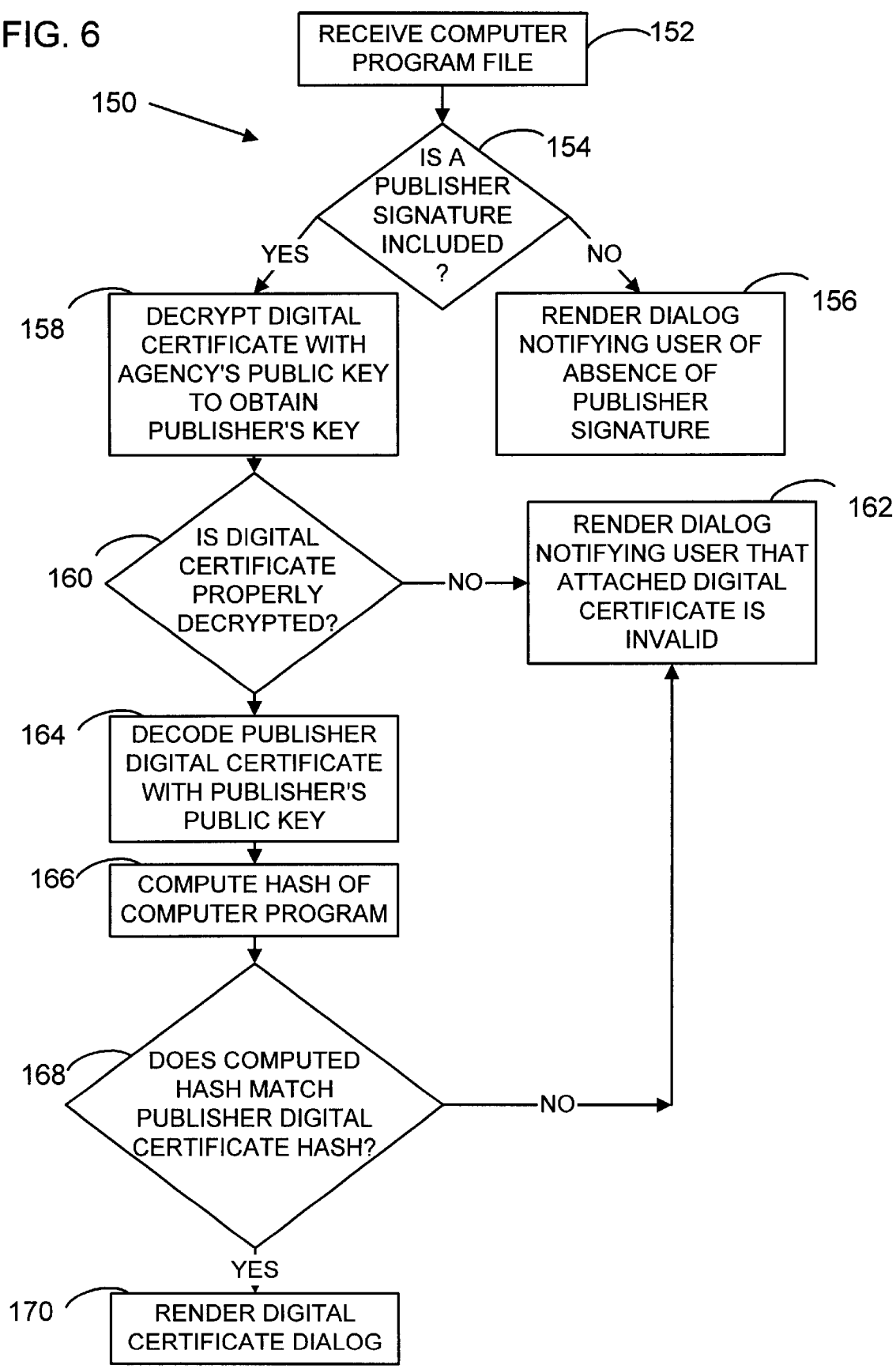

EMBEDDING CERTIFICATIONS IN EXECUTABLE FILES FOR NETWORK TRANSMISSION

FIELD OF THE INVENTION

This invention relates generally to obtaining computer software over an open computer network like the Internet and, in particular, to identifying the source of such software.

BACKGROUND AND SUMMARY OF THE INVENTION

The Internet is a well known, global network of cooperatively interconnected computer networks. The world wide web portion of the Internet is a collection of server computers (referred to as "sites") on the Internet which store HTML documents that can be publicly accessed by computer uses having a connection to the Internet. There are many such world wide web sites on the Internet.

Software, generally known as "Internet browsers," are now in wide-spread use for retrieving (also known as "downloading") and viewing electronic documents in hypertext markup language (HTML) format from the world-wide web. Originally, these HTML documents were simply ASCII coded character files generally consisting of text and HTML "tags" that specify formatting of the document, links (referred to as "hyper-links") to related documents on the network, and other files that contain information (e.g., sound, images, video, etc.) to be combined into the document. Typical HTML documents found on the world wide web include both text and tags specifying files for several images that are to be displayed with the text. In use, browser software allows a user to navigate (also known as "browsing") between documents and sites on the world-wide web.

More recently, the files that browsers are capable of accessing and utilizing include executable files such as, for example, OLE (object linking and embedding) controls and JAVA applets. These executable files were at first used to enhance the image characteristics of an HTML document by adding features that move or have other changing image characteristics. Moreover, it is expected that the functionality of such executable files will increase to include a wide range of applications and application components. In addition to browsers utilizing executable files, the marketing and distribution of computer software is increasingly utilizing network-based distribution rather than the traditional distribution of computer readable media such as magnetic (floppy) diskettes or optical (CD-ROM) disks.

A danger in wide-spread distribution of executable files over open networks like the Internet is an increased risk of contracting computer viruses or other malicious executable computer files. Computer viruses have long been a scourge of computer owners and operators because of the relative ease of contracting many viruses and the potentially devastating damage that viruses can cause. A common and effective defense to computer viruses has been to install executable files only from computer readable media that are known to be virus-free, such as the original media on which software are distributed by a manufacturer or software distributor or publisher.

Confidence in the authenticity of the original media is established by conventional marketing devices such as packaging, trademarks, the reputation of retailers offering the software, etc. Software that is distributed over an open network like the Internet does not have identifying packaging, fixed original media, or even a retail establishment that can be visited. As a consequence, software distribution over an open network is susceptible to corruption by a party impersonating a proper software distributor or by the software being modified after it is transmitted by the distributor.

One approach to addressing this problem is to create a protective and padded virtual machine on the software recipient's computer. Such a virtual machine, which is often referred to as a playpen or sandbox, allows untrusted, possibly malicious code to be executed without fear that it could cause any unauthorized or unwarranted actions. This approach is an outgrowth of the security architecture in existing computer operating systems. A problem with this approach is that it is extraordinarily difficult to create a sandbox that is actually secure against malicious code. Unexpected security holes are commonly discovered in supposedly secure operating systems that use this method.

But even assuming that this difficulty could be overcome, a fundamental quandary with the sandboxing approach is that there is a very strong tension between creating a sandbox safe enough to run perhaps malicious code, but yet with sufficient access to system resources to be capable of performing useful operations. For example, sandboxed code that is allowed to make network connections off of a host machine (e.g., TCP, FTP, EMail, or otherwise) should not have access to any information on the machine that is to be kept private. As other examples, some system utilities such as a disk defragmenter or an indexing utility that locates the lost documents on a hard disk would likely be inoperable as sandboxed code. A sandbox that successfully protected against the damage these utilities might possibly cause would prevent them from carrying out their intended purpose.

A certification or signing method ensures the authenticity and integrity of a computer program, an executable file, or code received over a computer network. The method is used by a publisher or distributor to "sign" an executable file so it can be transmitted with confidence to a recipient over an open network like the Internet. The executable file may be of any executable form, including an executable or portable executable .exe file format, a .cab cabinet file format, an .ocx object control format, or a Java class file.

The code signing method assures the recipient of the identity of the publisher as the source of file (i.e., its authenticity) and that the file has not been modified after being transmitted by the publisher (i.e., the integrity of the file). As a result, the code signing method allows an executable file to be transmitted over open computer networks like the Internet with increased certainty in the identity of the source of the file and minimized risk of contracting a computer virus or other malicious executable computer files.

In one implementation, the method includes determining a cryptographic digest or "hash" of the executable file and forming a publisher signature with the cryptographic digest. The publisher digital signature may also include an identifying name of the executable file and possibly a link or hyperlink to a description of the executable file. The publisher signature is formed with a public-private key signature algorithm, such as the RSA public key cipher, as is known in the art.

A publisher digital certificate is attached to the publisher signature. The publisher digital certificate is issued by a certification authority or agency to authenticate the identity of the publisher issuing the publisher signature. The publisher digital certificate is a cryptographic certificate that includes the software publisher's name, a public key corresponding to a private key used by the publisher to sign the file, an expiration date (or validity period) of the certificate, and possibly a link or hyperlink to the certification agency, including a statement of its certification policy and its identifier (e.g., trademark). The digital certificate is encrypted with a private key corresponding to a widely known and readily available certification agency public key. For example, the certification agency public key may be on or linked to a key that is on the recipient's computer in association with a browser application or another software application or the operating system. Alternatively, the certification agency public key may be posted on an open network like the Internet, or otherwise published.

This certification of the executable file or code is confirmed or read at the recipient's computer. The public key for the publisher's signature is obtained by decoding or decrypting the digital certificate with the certification agency public key, thereby assuring the authenticity of the software publisher. A cryptographic digest or hash is determined for the code as it is received. The digest is compared to the digest included in the publisher signature. A match between the digests confirms the integrity of the code. A dialog is then rendered by the recipient computer indicating who is providing the code and the certification agency that has authenticated the identity of the publisher.

The publisher digital certificate and the publisher signature together form a keyed source confirmation with a secure representation of the executable file. The source confirmation is keyed in that it (or a portion of it) is encrypted with a key, or includes a key, or both. The described implementation of publisher digital certificate and the publisher signature as a source confirmation is both encrypted with a key and includes a key.

In one embodiment, the certification is referenced in a header of the executable file, the reference including a pointer to the keyed source confirmation and an indication of the size of the keyed source confirmation. The header reference functions to identify the location of the keyed source confirmation so that it is not included in the cryptographic digest or hash that is determined for the code received at the recipient's computer. In addition, other components of the executable file or code may be excluded from the hash computed at the recipient's computer, as well as the original hash of the file. As a result, the hash that is computed can, if the executable file remains unchanged except for the excluded information, match the original cryptographic digest for the file.

This two-level identity confirmation provides the recipient with a concise, simple assurance of the authenticity and integrity of the downloaded code or executable file. By authenticating the identity of the publisher rather than the actual code, the certification agency need not authenticate the code being signed by the publisher. This allows the certification agency to authenticate the identity of a relatively large number of software publishers. If present, links to the certification agency and a description of the code allow the recipient to obtain additional information about the code and the agency's certification policies before choosing to run or accept the code.

Additional features and advantages of the invention will be made apparent from the following detailed description of an illustrated embodiment which proceeds with reference to the accompanying drawings.

BRIEF DESCRIPTION OF THE DRAWINGS

FIG. 6 is a flow diagram representing a publisher signature confirmation method.

DETAILED DESCRIPTION OF EMBODIMENT

Figure 1:
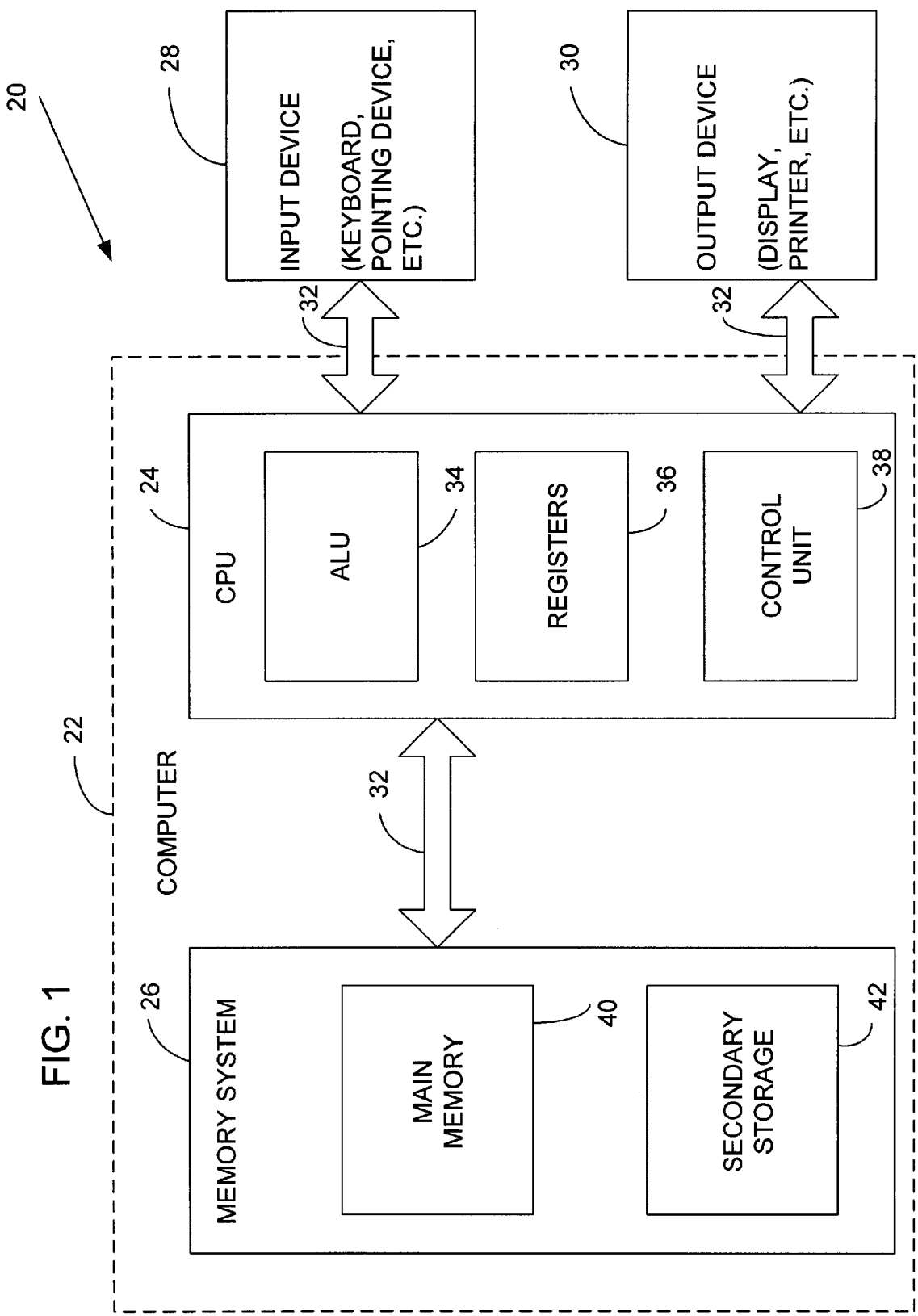
FIG. 1 is a block diagram of a computer system that may be used to implement a method and apparatus embodying of the present invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including, but not limited to, Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. The operating system may employ a graphical user interface where the display output of an application program is presented in a rectangular area (sometimes referred to as a "Window") on the screen of the output device 30 and is also multi-tasking (allowing application programs to execute computing tasks in multiple threads), such as Microsoft's Corporation's Windows 95 or Windows NT operating system, IBM's OS/2 Warp operating system, Apple's Macintosh System 7 operating system, X-Windows, etc.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
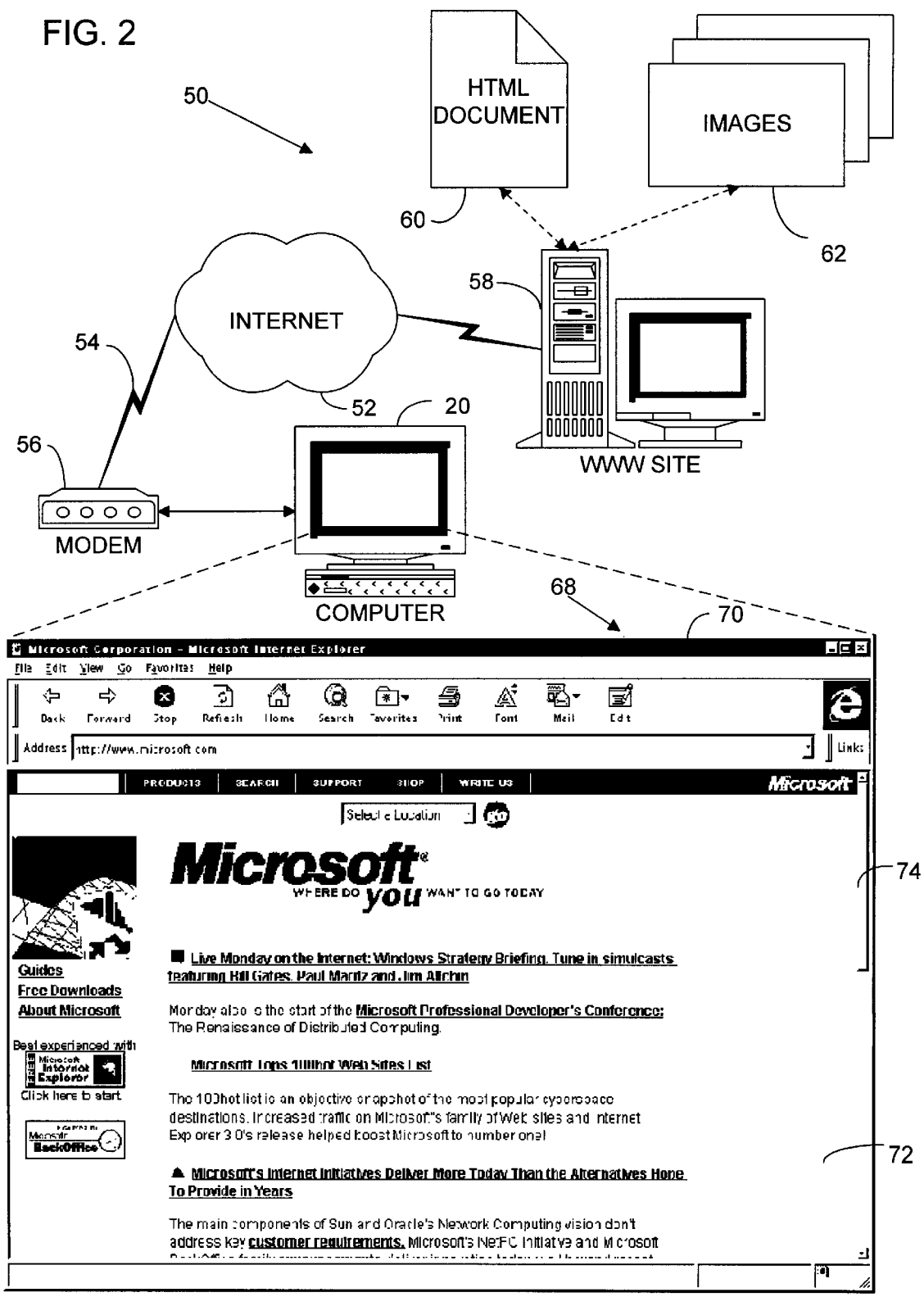
FIG. 2 is a block diagram of the computer system of FIG. 1 connected to a remote computer network (e.g., the Internet) for locally browsing electronic documents residing at a remote computer site.

FIG. 2 shows a browsing environment 50 in which computer 20 (also shown in FIG. 1) runs software, referred to herein as a "browser," for unified browsing of electronic documents and other data from local sources (e.g., the secondary storage 42 of FIG. 1) and from a remote computer network 52. The browser can be integrated with the operating system software, or can be separate application software. The illustrated remote computer network 52 is the Internet, which is described in the Background and Summary of the Invention above. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the illustrated browser can reside as files of a file system stored in the computer's secondary storage 42 (FIG. 1), or reside as resources at a remote computer 58 (also referred to as a "site") connected to the computer network 52, such as a world-wide web site on the Internet. The illustrated document 60 residing at the site 58 conforms with HTML standards, and may include extensions and enhancements of HTML standards. However, the illustrated browser also can browse documents having other data formats (e.g., Microsoft Word documents, etc.) from the computer 20 or remote computer 58. In conformance with HTML, the illustrated document 60 can incorporate other additional information content 62, such as images, audio, video, executable programs, etc. (hereafter simply "images" 62), which also reside at the remote computer 58. The document 60 and images 62 are stored as files in a file system of the remote computer 58. The document 60 incorporates the images 62 using HTML tags that specify the location of files or other Internet resource containing the images on the Internet 52.

When used for browsing documents, the illustrated browser displays the document in a window 68 or rectangular area of the computer's display 30 allocated to the browser by the operating system. The illustrated window 68 comprises a frame 70, a document display area 72, and user interface controls 74. The browser displays the document within the document display area 72 of the window 68.

Figure 3:
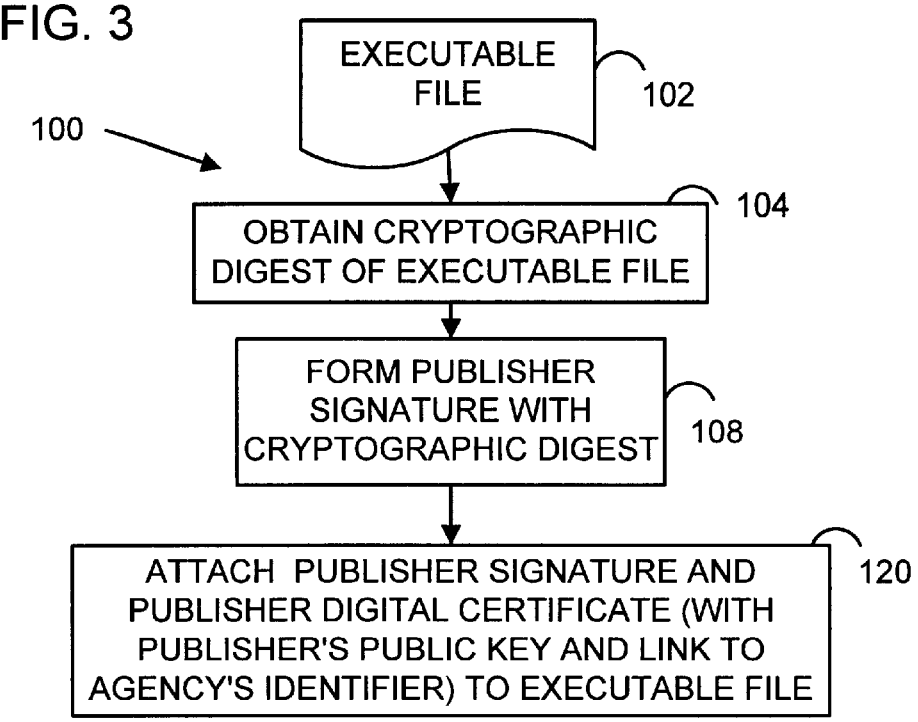
FIG. 3 is a flow diagram representing a code certification or signing method for ensuring the authenticity and integrity of a computer program or an executable file received over a computer network.

FIG. 3 is a flow diagram representing a code certification or signing method 100 for ensuring the authenticity and integrity of a computer program, code, or an executable file 102 received over computer network 52, or any other computer network. Method 100 is used by a publisher or distributor to "sign" executable file 102 so it can be transmitted securely to a recipient over an open network like the Internet. Executable file 102 may be of any executable form including, for example, an .exe executable or portable executable file format, a .cab cabinet file format, an .ocx object control format, or a Java class file format.

Code signing method 100 assures the recipient of the identity of the source of file 102 (i.e., its authenticity) and that the file was not modified after it was transmitted by that source (i.e., the integrity of file 102). As a result, code signing method 100 allows an executable file to be transmitted over open computer networks with increased certainty in the identity of the source of the file and minimized risk of contracting a computer virus or other malicious executable computer files.

Figure 4:
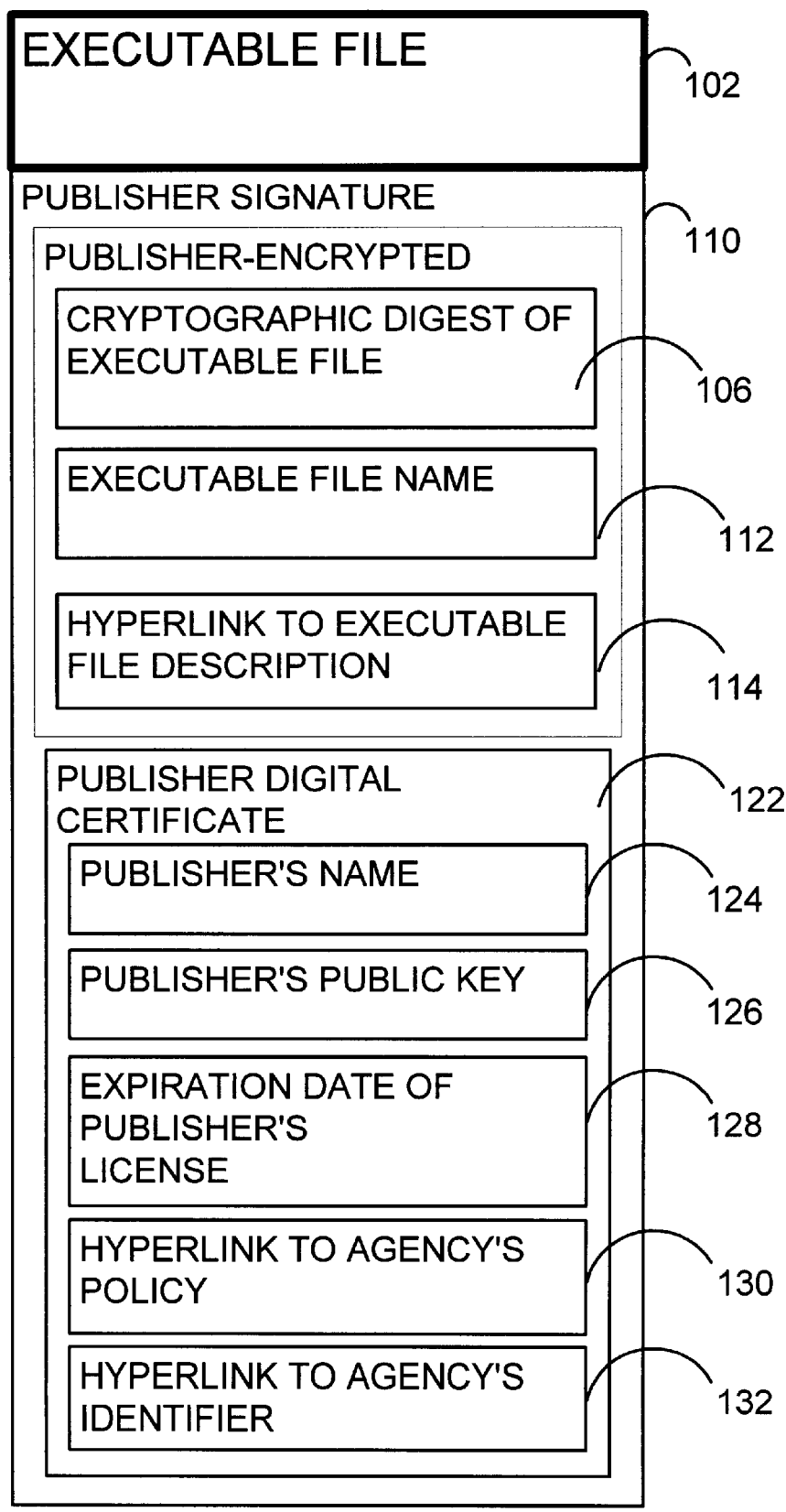
FIG. 4 is a schematic representation of an executable file with a publisher signature according to the present invention.

Process block 104 indicates that a cryptographic digest or "hash" 106 (FIG. 4) of executable file 102 is obtained or computed. Standard hash functions are available, such as "MD 5" and "SHA". These functions take a variable-length input string and convert it to a fixed-length output string of 128 bits or more (called a cryptographic digest). This fixed-length string "fingerprints" the file by producing a value that indicates whether a file submitted for download matches the original file. Hashing functions and the values they generate are secure in that it is computationally infeasible to alter a document without changing its hash.

Process block 108 indicates that a publisher signature 110 (FIG. 4) is formed with cryptographic digest 106. Publisher signature 110 may also include an identifying name 112 of executable file 102 and a link or hyperlink 114 to a description of executable file 102.

In one embodiment, publisher signature 110 is formed with a public-private key signature algorithm, such as the RSA public key cipher according to the PKCS #7 format promulgated by RSA Laboratories, PKCS#7: Cryptographic Message Syntax Standard. Version 1.5, November, 1993. Public key algorithms use a confidential private key to encrypt information and a freely available public key to decrypt or validate the encrypted information. Such encryption is secure because is it computationally infeasible to determine the private key from the public key.

Process block 120 indicates that a publisher digital certificate 122 (FIG. 4) and publisher signature 110 are attached or appended to or incorporated to executable file 102. Publisher signature 110 and publisher digital certificate 122 together form a keyed source confirmation with a secure representation of the executable file. The source confirmation is keyed in that it (or a portion of it) is encrypted with a key, or includes a key, or both. A source confirmation with publisher signature 110 and publisher digital certificate 122 as described is both encrypted with a key and includes a key.

Publisher digital certificate 122 is issued by a certification authority or agency to authenticate the identity of the publisher issuing publisher signature 110. Publisher digital certificate 122 is a cryptographic certificate that conforms, for example, to a standard X.509 certificate format with version 3 extensions, as promulgated in The Directory-Authentication Framework, CCITT (Consultation Committee, International Telephone and Telegraph) International Telecommunications Union, Geneva, 1989.

In one implementation, publisher digital certificate 122 includes the software publisher's name 124, the public key 126 corresponding to the private key used by the publisher to form publisher signature 110, an expiration date (or validity period) 128 of the certificate, a link or hyperlink 130 to the certification agency's policy for granting certificates, and a link or hyperlink 132 to the certification agency's identifier (e.g., trademark). In addition, publisher digital certificate 122 can include a version indicator that identifies the certificate format, a serial number and name that identify the certification authority, an algorithm identifier that identifies the algorithm used to sign the certificate, together with any necessary parameters, and a signed-data object or signature by the certification authority or agency (e.g., according to the PKCS #7). Publisher digital certificate 122 is issued by a certification agency that typically is separate from the software publisher. Digital certificate 122 is encrypted with a private key corresponding to a widely known and readily available public key. In other implementations, for example, publisher digital certificate 122 might not include software publisher's name 124, link 130, or link 132.

Figure 5:
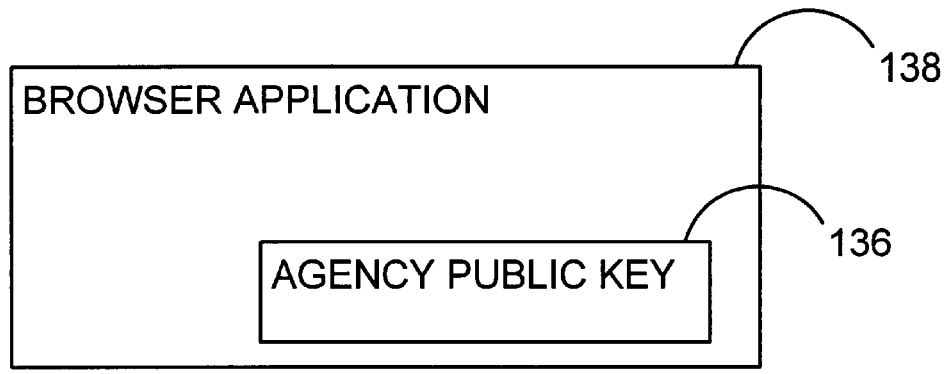
FIG. 5 is a schematic representation of a root public key incorporated into a browser application.

With reference to FIG. 5, a root public key 136 for decrypting digital certificate 122 is associated with a browser application 138 that implements calls for reading and decrypting publisher signature 110. As a result, root public key 136 is widely known and distributed and relatively insusceptible to malicious substitution with a spurious public key. It will be appreciated, however, that root public key 136 can be widely known and distributed in other manners, such as by incorporation into other software applications or operating systems, posting on an open network like the Internet, or publication.

FIG. 6 is a flow diagram representing a publisher signature confirmation method 150 that is performed, for example, by or in response to a call by browser application 138. Signature confirmation method 150 provides a recipient of executable file 102 (FIG. 4) with simple and effective assurance of the authenticity and integrity of executable file 102.

Process block 152 indicates that a user receives an executable computer program file via an open network like the Internet.

Decision block 154 represents an inquiry as to whether the executable file includes a publisher signature 110. For example, browser application 138 searches the received executable file or its header (as described below in greater detail) for a publisher signature in the form of a cryptographic message of a conventional standard such as, for example, PKCS #7 version 1.5, promulgated by RSA Laboratories. Whenever a publisher signature is not included in the program file, decision block 154 proceeds to process block 156, and otherwise proceeds to process block 158.

Process block 156 indicates that a dialog or notice is rendered notifying the user of the absence of a publisher signature in the program file 138. The dialog can be rendered by browser application 138, for example, and can include user queries as to whether to open or run executable file 102.

Process block 158 indicates that publisher digital certificate 122 is decrypted with a widely known public key, such as public key 136 associated with browser application 138.

Decision block 160 represents an inquiry as to whether digital certificate 122 is properly decrypted with public key 136 to provide the information (e.g., public key 126, etc.) in digital certificate 122 in predetermined formats. Decision block 160 proceeds to process block 162 whenever digital certificate 122 is not properly decrypted by public key 136, and otherwise proceeds to process block 164.

Process block 162 indicates that a dialog or notice is rendered, for example, by browser application 138, notifying the user that the publisher signature 110 attached to the program file is invalid. The dialog can be rendered by browser application 138, for example, and can include user queries as to whether to open or run executable file 102.

Process block 164 indicates that publisher signature 110 is decrypted with the publisher's public key 126 included in and retrieved from publisher digital certificate 122.

Process block 166 indicates that a hash or cryptographic digest is computed for the executable file 102, but not publisher signature 110 or selected other file components, as described below in greater detail. The hash or cryptographic digest is computed according to the hash algorithm, such as MD 5 or SHA 1, that is used to determine the cryptographic digest 106 included in the publisher signature 110.

Decision block 168 represents an inquiry as to whether the cryptographic digest computed at the recipient computer matches the hash or cryptographic digest 106 included in publisher signature 110. Decision block 168 proceeds to process block 170 whenever the user-computed hash matches the cryptographic digest 106 included in publisher signature 110, and otherwise returns to process block 162.

Process block 170 indicates that the recipient computer selectively renders a dialog 180 (FIG. 7) confirming the certification of the received code or executable file. The rendering of the dialog is selective in that the recipient can prevent dialog 180 from being rendered, for example, for particular certification agencies or publishers selected by the recipient or user as being trusted software publishers.

Figure 7:
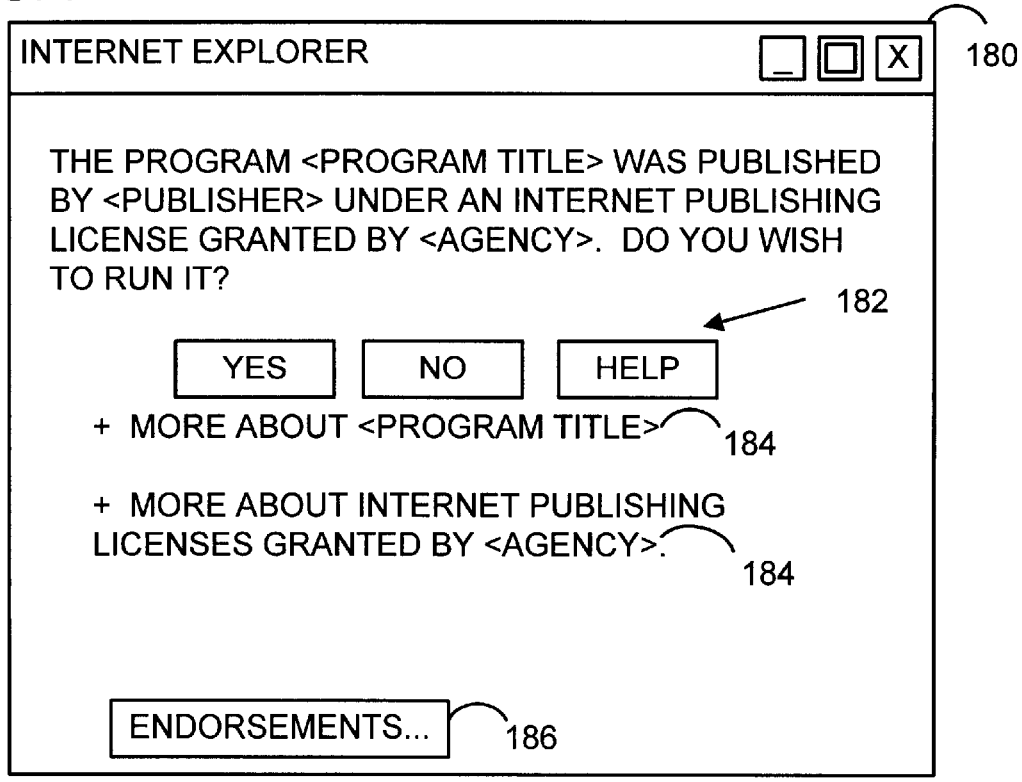
FIG. 7 illustrates an exemplary digital certificate dialog rendered on a display screen to provide a user with a simple two-part identity confirmation of the publisher of an executable file.

FIG. 7 illustrates an exemplary digital certificate dialog 180 rendered on a display screen associated with the recipient computer 20 in accordance with process block 170 of signature confirmation method 150. Dialog 180 provides a user with a simple two-part identity confirmation of the publisher of executable file 102. More specifically, dialog 180 identifies the executable file 102 as having been "published by Publisher under an Internet publishing license granted by Agency." This identification of the Publisher with confirmation by the Agency or certification Agency provides the user with simple and effective authentication.

In contrast, conventional certification methods can result in extensive chains of certifications and signatures by parties that each must be known to and accepted by the user. In accordance with this invention, the identity of the software publisher is certified by the certification agency. The reputation of the certification agency, together with the notoriety or fame of a public key associated with the certification authority, provide a secure affirmation of the identity of the software publisher. Moreover, the certification agency can reasonably certify the identity of many publishers without the unworkable burden, on the agency and the publishers, of confirming the integrity of each executable file signed by each of the publishers.

In addition to certifying the identity of the publisher by the name and reputation of the certification agency, dialog 180 provides the recipient of the software with graphical control buttons 182 to selectively elect whether to run the software and links 184 to additional information about the software and the publishing licenses issued by the certification agency. Links 184 allow a software recipient, before deciding to run the received or downloaded code, to obtain additional information about the software and the policies or authority under which digital certificate 122 was granted to the publisher who signed the software. This additional information could be particularly helpful if the certification agency or the software are not well-known to the recipient. Graphical control buttons 182 give the recipient the choice of whether to run the software based upon the reputation and apparent credibility of the publisher and the certification agency. An optional graphical control button 186 accesses links to additional information about the executable file, such as endorsements or reviews. The links to this additional information would be included in publisher signature 110.

In one embodiment, the agency granting publisher digital certificate 122 holds the private key that directly complements the root public key 136 associated with browser application 138. Alternatively, the agency granting publisher digital certificate 122 could hold a private key that is indirectly linked to root public key 136 through private keys for one or more digital certificates by which a chain of at least one meta-agency grants the certification agency the authority to grant the digital certificate 122.

Figure 8:
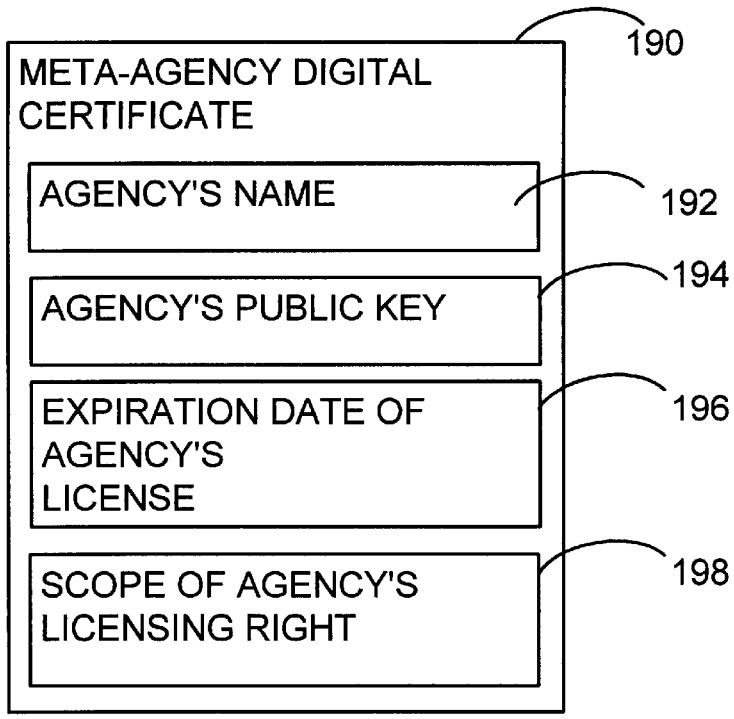
FIG. 8 is a diagrammatic illustration of a meta-agency digital certificate by which a higher-level or meta-agency grants a certification agency authority to issue publisher digital certificates.

FIG. 8 is a diagrammatic illustration of a meta-agency digital certificate 190 by which a higher-level or meta-agency grants a certification agency authority to issue publisher digital certificates 122. One or more meta-agency digital certificates 190 may be appended to or incorporated in publisher digital certificate 122 according to the manner in which certificate 122 is linked to root public key 136. Meta-agency digital certificate 190 includes for the certification agency information that is analogous to the publisher information in publisher digital certificate 180, such as the agency name 192 and its public key 194. In addition, meta-agency digital certificate 190 includes an expiration date 196 for the certification-granting authority of the certification agency and an indication 198 of the scope of the certification-granting authority (e.g., whether the certification authority can only grant publisher digital certificates or can also license other certification authorities).

Publisher license expiration date 128 (FIG. 4) and agency license expiration date 196 (FIG. 8) provide respective digital certificates 122 and 190 with enhanced security by limiting the periods during which they are valid and therefore susceptible to attempted counterfeiting. Although it is computationally infeasible to compute a private key from a public key, it is possible that a private key could be compromised in other ways. For example, a private key could be compromised by lax security precautions that allow the private key to be stolen or publicly released or a publisher with a proper and valid certificate ceases to adequately protect the software published under its license.

Meta-agency digital certificate 190 provides publisher digital certificate 122 with one or more indirect links to root public key 136. With one meta-agency certificate 190, root public key 136 complements the private key for encoding or encrypting the meta-agency certificate 190, which itself holds the public key for the publisher digital certificate 122. With more than one meta-agency certificate 190, root public key 136 complements the private key for encoding or encrypting the highest level meta-agency certificate 190, which holds the public key for the next lower level certificate 190. Each meta-agency certificate 190 holds the public key for a next lower meta-agency certificate 190, except that the lowest level certificate 190 holds the public key for the publisher digital certificate 122.

Dialog 180 (FIG. 7) provides the recipient with identifying information about the publisher and the immediate certification agency. This two-level identification confirmation is applied whether the certification agency immediately granting publisher certificate 122 is linked directly or indirectly by one or more meta-agency certificates to root public key 136. By omitting information about any meta-agencies in dialog 180, a recipient is spared the burden of separately confirming the validity of each of meta-agency digital certificate, thereby simplifying the confirmation for the recipient.

Figure 9:
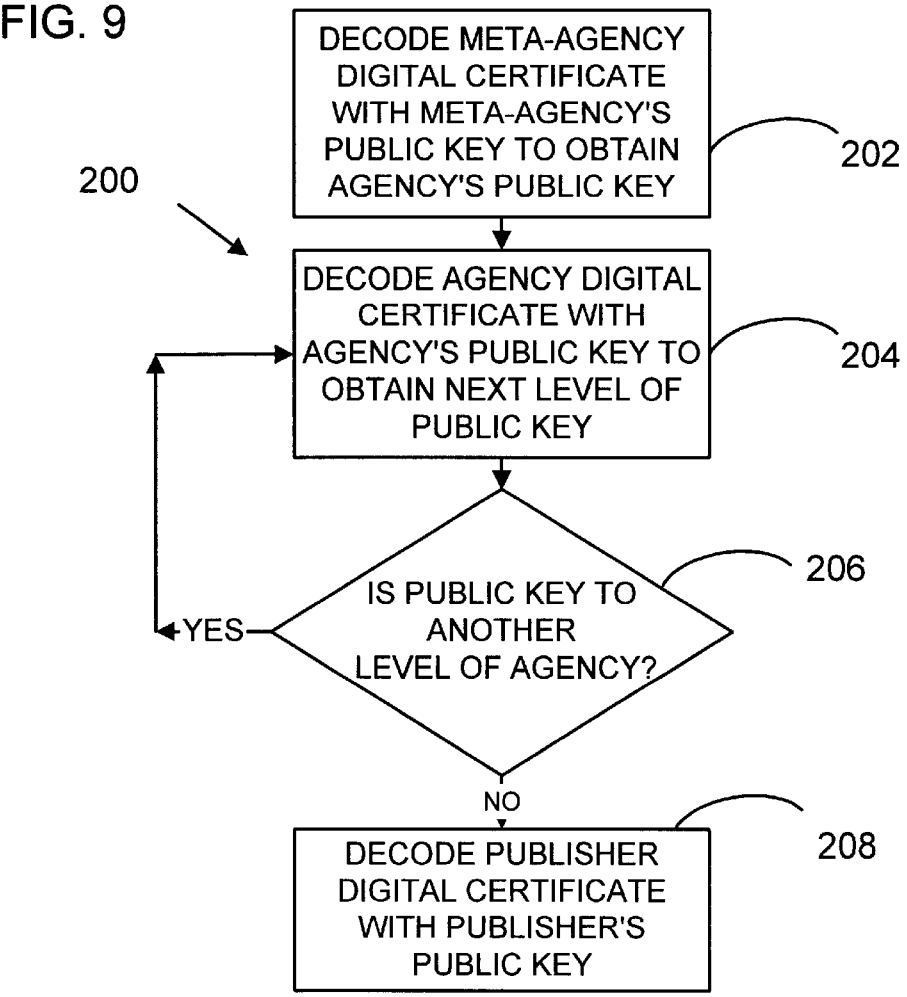
FIG. 9 is a flow diagram of an agency/meta-agency certificate decoding method.

FIG. 9 is a flow diagram of an agency certificate decoding method 200 that is performed in substitution for process blocks 158 and 164 of confirmation method 150. (It will be appreciated that inquiry 160 of method 50 would be performed for each certificate that is decoded or decrypted.) Process block 202 indicates that a top level meta-agency digital certificate 190 is decrypted with a widely known public key, such as public key 136 associated with browser application 138.

Process block 204 indicates that a next lower level meta-agency digital certificate 190 is decrypted with a public key from the higher level agency certificate.

Decision block 206 represents an inquiry as to whether the current lower level meta-agency digital certificate 190 includes a public key to another agency digital certificate. Decision block 206 returns to process block 204 whenever the current lower level meta-agency digital certificate 190 includes a public key to another agency, and otherwise proceeds to process block 208.

Process block 208 indicates that publisher digital certificate 122 is decrypted with a public key obtained from the lowest level agency certificate 190.

In one embodiment, publisher signature 110 is attached or appended to or embedded or incorporated in executable file 102 such that it forms a single signed file to simplify transmission, improve the security afforded by publisher signature 110, and to maintain the transparent operation of publisher signature 110 for the recipient. A single signed file prevents publisher signature 110 from being dissociated from its corresponding executable file 102 in transmission or at the recipient's computer. It will be appreciated, however, that publisher signature 110 could alternatively be transmitted with executable file 102 as a separate file while achieving benefits of the present invention.

A consequence of transmitting executable file 102 and publisher signature 110 as a single signed file is that the signed file received by the recipient differs from executable file 102 upon which publisher signature 110 is based. Step 166 in publisher signature confirmation method 150 (FIG. 6) includes determining a cryptographic digest for the executable file 102. A cryptographic digest computed for the single signed file, including executable file 102 and publisher signature 110, would not match the cryptographic digest 106 of executable file 102 alone included in publisher signature 110. This embodiment includes, therefore, a manner of incorporating or embedding publisher signature 110 in executable file 102 such that the latter may be distinguished for computing a cryptographic digest.

Many file formats, including executable file formats, have file headers that include identifying and format information about the file. The information in and the manner of organizing such headers is established by convention for each executable file format. While described with reference to particular file formats, the following description of a first embodiment is similarly applicable to other file formats with accommodation for the particulars of such other formats.

Publisher digital certificate 122 and publisher signature 110 together form a keyed source confirmation with a secure representation of the executable file. The source confirmation is keyed in that it (or a portion of it) is encrypted with a key, or includes a key, or both. A source confirmation with publisher digital certificate 122 and the publisher signature 110 as described is both encrypted with a key and includes a key.

In one embodiment, the certification is referenced in a header of the executable file, the reference including a pointer to the keyed source confirmation and an indication of the size of the keyed source confirmation. The header reference functions to identify the location of the keyed source confirmation so that it is not included in the cryptographic digest or hash that is determined for the code received at the recipient's computer. In addition, other components of the executable file or code may be excluded from the hash computed at the recipient's computer, as well as the original hash of the file. As a result, the hash that is computed can, if the executable file remains unchanged except for the addition of the source confirmation, match the original cryptographic digest for the file. In one implementation, the source confirmation is positioned substantially at the end of the executable file, but in other implementations the source confirmation could be placed at other locations in the file, including at substantially the beginning of the file.

In the first embodiment, publisher signature 110 is incorporated or embedded in executable file 102 formatted as an architecture-nonspecific portable executable (PE) file (sometimes referred to as an image file), which is described below with reference to a Common Object File Format (COFF) file utilized by the Microsoft Windows NT operating system. Although not limited to the Microsoft Windows NT operating system, the description of PE or image files sometimes refers thereto for purposes of explanation.

Both types of files include file headers with fields that identify selected information about the file. The fields are established at particular offsets from the beginning of the file or file segment in which the offset is included. The offsets are delineated in particular numbers of memory units, such as 8-bit bytes. Table 1 lists fields used in the headers of PE and COFF files. It will be appreciated, however, that other file formats could utilize similar header information.

TABLE 1

| Offset | Size | Field | Description |
| --- | --- | --- | --- |
| 0 | 2 | Machine | Number identifying type of target machine. See Table 2, "Machine Types," for more information. |
| 2 | 2 | Number of Sections | Number of sections; indicates size of the Section Table, which immediately follows the headers. |
| 4 | 4 | Time/Date Stamp | Time and date the file was created. |
| 8 | 4 | Pointer to Symbol Table | Offset, within the COFF file, of the symbol table. |
| c12 | 4 | Number of Symbols | Number of entries in the symbol table. This data can be used in locating a string table, which immediately follows the symbol table. |
| 16 | 2 | Optional Header Size | Size of the optional header, which is included for executable files but not object files. An object file should have a value of 0 here. The format is described in the section "Optional Header." |
| 18 | 2 | Characteristics | Flags indicating attributes of the file. See Table 3, "Characteristics," for specific flag values. |

The Machine field at offset 0 may have one of the values set forth in Table 2 specifying the machine (CPU) type for which the file was created. An image file can be run only on the specified machine or a system emulating it. The Characteristics field at offset 18 contains flags that indicate attributes of the object or image file, as set forth in Table 3. The optional header is described in greater detail below. The remaining header fields listed in Table 1 as Number of Sections, Time/Date Stamp, Pointer to Symbol Table, Number of Symbols, Number of Sections relate to file size, date and organization details and are self-explanatory.

TABLE 2

| Constant | Value | Description |
| --- | --- | --- |
| IMAGE_FILE_MACHINE_UNKNOWN | 0 × 0 | Contents assumed to be applicable to any machine type. |
| IMAGE_FILE_MACHINE_I386 | 0 × 14c | Intel 386 or later, and compatible processors. |
| IMAGE_FILE_MACHINE_R4000 | 0 × 166 | MIPS ® little endian. |
| IMAGE_FILE_MACHINE_ALPHA | 0 × 184 | Alpha AXP ™. |
| IMAGE_FILE_MACHINE_M68K | 0 × 268 | Motorola 68000 series. |
| IMAGE_FILE_MACHINE_POWERPC | 0 × 1F0 | Power PC, little endian. |
| IMAGE_FILE_MACHINE_PARISC | 0 × 290 | PA RISC. |

TABLE 3

| Flag | Value | Description |
| --- | --- | --- |
| IMAGE_FILE_RELOCS_STRIPPED | 0 × 0001 | Image only. Indicates that the file does not contain base relocations and must therefore be loaded at its preferred base address. If the base address is not available, the loader reports an error. operating systems running on top of MS-DOS (Win32s ™) are generally not able to use the preferred base address and so cannot run these images. However, beginning with version 4.0, Windows will use an application's referred base address. |
| IMAGE_FILE_EXECUTABLE_IMAGE | 0 × 0002 | Image only. Indicates that the image file is valid and can be run. If this flag is not set, it generally indicates a linker error. |
| IMAGE_FILE_LINE_NUMS_STRIPPED | 0 × 0004 | COFF line numbers have been removed. |
| IMAGE_FILE_LOCAL_SYMS_STRIPPED | 0 × 0008 | COFF symbol table entries for local symbols have been removed. |
| IMAGE_FILE_MINIMAL_OBJECT | 0 × 0010 | Reserved for future use. |
| IMAGE_FILE_UPDATE_OBJECT | 0 × 0020 | Reserved for future use. |
| IMAGE_FILE_16BIT_MACHINE | 0 × 0040 | Use of this flag is reserved for future use. |
| IMAGE_FILE_BYTES_REVERSED_LO | 0 × 0080 | Little endian: LSB precedes MSB in memory. |
| IMAGE_FILE_32BIT_MACHINE | 0 × 0100 | Machine based on 32-bit-word architecture. |
| IMAGE_FILE_DEBGUG_STRIPPED | 0 × 0200 | Debugging information removed from image file. |
| IMAGE_FILE_PATCH | 0 × 0400 | Reserved for future use. |
| IMAGE_FILE_SYSTEM | 0 × 1000 | The image file is a system file, not a user program. |
| IMAGE_FILE_DLL | 0 × 2000 | The image file is a dynamic-link library (DLL). Such files are considered executable files for almost all purposes, although they cannot be directly run. |
| IMAGE_FILE_BYTES_REVERSED_HI | 0 × 8000 | Big endian: MSB precedes LSB in memory. |

The optional header is optional in that it is included in image (PE) files but not object files (COFF object modules). As a result, this header is also referred to as the PE Header. An object file may have an optional header, but generally this header has no function in an object file except to increase size. Table 4 lists the three major parts of the Optional Header.

TABLE 4

| Offset | Size | Header part | Description |
| --- | --- | --- | --- |
| 0 | 28 | Standard fields | These are defined for all implementations of COFF, including UNIX ®. |
| 28 | 68 | NT-specific fields | These include additional fields to support specific features of Windows NT (for example, subsystem). |

TABLE 4-continued

| Offset | Size | Header part | Description |
| --- | --- | --- | --- |
| 96 | 128 | Data directories | These fields are address/size pairs for special tables, found in the image file and used by the operating system (for example, Import Table and Export Table. |

Table 5 lists the first nine fields of the Optional Header, which are standard fields that are defined for every implementation of COFF. These fields contain general information useful for loading and running an executable file. Table 6 lists the next twenty-one fields, which are an extension to the COFF Optional Header format and contain additional information needed by the linker and loader in Windows NT.

TABLE 5

| Offset | Size | Field | Description |
| --- | --- | --- | --- |
| 0 | 2 | Magic | Unsigned integer identifying the state of the image file. The most common number is 0413 octal (0 × 10B), identifying it as a normal executable file. 0407 (0 × 107) identifies a ROM image. |
| 2 | 1 | LMajor | Linker major version number. |
| 3 | 1 | LMinor | Linker minor version number. |
| 4 | 4 | Code Size | Size of the code (text) section, or the sum of all code sections if there are multiple sections. |
| 8 | 4 | Initialized Data Size | Size of the initialized data section, or the sum of all such sections if there are multiple data sections. |
| 12 | 4 | Uninitialized Data Size | Size of the uninitialized data section (BSS), or the sum of all such sections if there are multiple BSS sections. |
| 16 | 4 | Entry Point RVA | Address of entry point, relative to image base, when executable file is loaded into memory. For program images, this is the starting address. For device drivers, this is the address of the initialization function. |
| 20 | 4 | Base Of Code | Address, relative to image base, of beginning of code section, when loaded into memory. |
| 24 | 4 | Base Of Data | Address, relative to image base, of beginning of data section, when loaded into memory. |

TABLE 6

| Offset | Size | Field | Description |
| --- | --- | --- | --- |
| 28 | 4 | Image Base | Preferred address of first byte of image when loaded into memory; must be a multiple of 64K. |
| 32 | 4 | Section Alignment | Alignment (in bytes) of sections when loaded into memory. Must greater or equal to File Alignment. Default is the page size for the architecture. |
| 36 | 4 | File Alignment | Alignment factor (in bytes) used to align pages in image file. The value should be a power of 2 between 512 and 64K inclusive. |
| 40 | 2 | OS Major | Major version number of required OS. |
| 42 | 2 | OS Minor | Minor version number of required OS. |
| 44 | 2 | User Major | Major version number of image. |
| 46 | 2 | User Minor | Minor version number of image. |
| 48 | 2 | SubSys Major | Major version number of subsystem. |
| 50 | 2 | SubSys Minor | Minor version number of subsystem. |
| 52 | 4 | Reserved | |
| 56 | 4 | Image Size | Size, in bytes, of image, including all headers; must be a multiple of Section Alignment. |
| 60 | 4 | Header Size | Combined size of MS-DOS Header, PE Header, and Object Table. |
| 64 | 4 | File Checksum | Image file checksum. The algorithm for computing is incorporated into IMAGHELP.DLL. The following are checked for validation at load time: all drivers, any DLL loaded at boot time, and any DLL that ends up in the server. |
| 68 | 2 | SubSystem | Subsystem required to run this image. See "Windows NT Subsystem" below for more information. |
| 70 | 2 | DLL Flags | Obsolete. |
| 72 | 4 | Stack Reserve Size | Size of stack to reserve. Only the Stack Commit Size is committed; the rest is made available one page at a time, until reserve size is reached. |
| 76 | 4 | Stack Commit Size | Size of stack to commit. |

TABLE 6-continued

| Offset | Size | Field | Description |
|---|---|---|---|
| 80 | 4 | Heap Reserve Size | Size of local heap space to reserve. Only the Heap Commit Size is committed; the rest is made available one page at a time, until reserve size is reached. |
| 84 | 4 | Heap Commit Size | Size of local heap space to commit. |
| 88 | 4 | Loader Flags | Obsolete. |
| 92 | 4 | Number of Data Directories | Number of data-dictionary entries in the remainder of the Optional Header. Each describes a location and size. |

Table 7 lists values defined for the Subsystem field of the Optional Header. They determine what, if any, operating system (e.g., Windows NT) subsystem is required to run the image file.

TABLE 7

| Constant | Value | Description |
|---|---|---|
| IMAGE_SUBSYSTEM_UNKNOWN | 0 | Unknown subsystem. |
| IMAGE_SUBSYSTEM_NATIVE | 1 | Used for device drivers and native Windows NT processes. |
| IMAGE_SUBSYSTEM_WINDOWS_GUI | 2 | Image runs in the Windows ™ graphical user interface (GUI) subsystem. |
| IMAGE_SUBSYSTEM_WINDOWS_CUI | 3 | Image runs in the Windows character subsystem. |
| IMAGE_SUBSYSTEM_POSIX_CUI | 7 | Image runs in the Posix character subsystem. |

Each data directory gives the address and size of a table or string used by Windows NT. These are loaded into memory so that they can be used by the system at run time. A data directory is an eight-byte field that has the following declaration:

```
typedef struct _IMAGE_DATA_DIRECTORY {
    DWORD RVA;
    DWORD Size;
} IMAGE_DATA_DIRECTORY, *PIMAGE_DATA_
    DIRECTORY;
```

The first field, RVA, is the relative virtual address of the table. The RVA is the address of the table, when loaded, relative to the base address of the image.
The second field gives the size in bytes. Table 8 lists the data directories, which form the last part of the Optional Header.

The certificate table field at offset 128 references the address and size of an attribute certificate table that contains one or more fixed length table entries. Each entry of this table identifies the beginning location and length of a corresponding signature 110 or certificate 122. There is one Certificate Table entry for each certificate stored in this section. The number of entries in the certificate table is equal to the size of the certificate table (found in offset 132) divided by the size of an entry in the certificate table (8). The size of the certificate table includes the table entries, not the actual certificates, which are pointed to by the table entries. Table 9 shows the format of each table entry.

TABLE 9

| Offset | Size | Field | Description |
|---|---|---|---|
| 0 | 4 | Certificate Data | File pointer to the certificate data. This will always point to an address |

TABLE 8

| Offset | Size | Field | Description |
|---|---|---|---|
| 96 | 8 | Export Table | Export Table address and size. |
| 104 | 8 | Import Table | Import Table address and size |
| 112 | 8 | Resource Table | Resource Table address and size. |
| 120 | 8 | Exception Table | Exception Table address and size. |
| 128 | 8 | Certificate Table | Attribute Certificate Table address and size. |
| 136 | 8 | Base Relocation Table | Base Relocation Table address and size. |
| 144 | 8 | Debug | Debug data starting address and size. |
| 152 | 8 | Copyright | Copyright string address and length. |
| 160 | 8 | Global Ptr | Relative virtual address of the global pointer register. Size member of this structure is set to 0. |
| 168 | 8 | TLS Table | Thread Local Storage (TLS) Table address and size. |
| 176 | 8 | Load Config Table | Load Configuration Table address and size. |
| 184 | 40 | Reserved | |

TABLE 9-continued

| Offset | Size | Field | Description |
|---|---|---|---|
| | | | that is octaword aligned (i.e., is a multiple of 8 bytes and so the low-order 3 bits are zero). |
| 0 | 4 | Size of Certificate | Unsigned integer identifying the size (in bytes) of the certificate. |

In one embodiment, an attribute certificate table is added at the end of the image, with only a debug section following (if a debug section is present). Certificates start on an octaword boundary. If a certificate is not an even number of octawords long, it is zero padded to the next octaword boundary. However, the length of the certificate does not include this padding and so any certificate navigation software must be sure to round up to the next octaword to locate another certificate. Each certificate is represented by a single Certificate Table entry. The certificate starting location and length is specified by an entry in the Certificate Table.

Several certificates or attribute certificates are expected to be used to verify the integrity of an image, image file, or PE file. The certificates ensure that a particular image file, or part of that image file, has not been altered in any way from its original form, and typically include cryptographic digests that are sometimes called message digests.

Message digests are similar to a file checksum in that they produce a value that relates to the integrity of a file. A checksum is produced by a simple algorithm and its use is primarily to detect memory failures. That is, it is used to detect whether the values stored in memory have become corrupted. A message digest is similar to a checksum in that it will also detect file corruptions. However, unlike most checksum algorithms, a message digest also has the property that it is very difficult to modify a file such that it will have the same message digest as its original (unmodified) form. That is, a checksum is intended to detect simple memory failures leading to corruption, but a message digest can detect intentional modifications to a file, such as those introduced by viruses, hackers, or Trojan Horse programs.

It is not desirable to include all image file data in the calculation of a message digest. In some cases it simply presents undesirable characteristics (like the file is no longer localizable without regenerating certificates) and in other cases it is simply infeasible. For example, it is not possible to include all information within an image file in a message digest, then insert a certificate containing that message digest in the file, and later be able to generate an identical message digest by including all image file data in the calculation again (since the file now contains a certificate that wasn't originally there).

The following fields should not or can not be included in a message digest. Attribute or publisher certificates are omitted from the calculation of a message digest that resides within the certificate. The overall integrity of the image file is not affected by adding or removing certificates. To exclude attribute certificate information from the message digest calculation, the following information is excluded from that calculation: the certificate table field of the optional header data directories and the certificate table and corresponding certificates pointed to by the certificate table field.

Debug information may be considered advisory to debuggers and does not affect the integrity of the actual executable program. The debug information can be removed from an image file without affecting its functionality. (Deletion of debug information is sometimes used to reduce the size of distributed image files.) To exclude debug information from a message digest, the following information is excluded from that calculation: the debug entry of the data directory in with optional header and the debug section.

The file Checksum field of the Windows NT-specific fields of the optional header should be omitted. This checksum field includes the entire file (including any attribute certificates included in the file) and would likely be changed by insertion of a certificate.

There are several fields that are either unused or obsolete. The values of these fields are undefined and can change after the message digest is calculated. These fields include: reserved field of the optional header Windows NT-specific fields (offset 52), the obsolete DLL flags field of the optional header Windows NT-specific fields, the obsolete loader flags field of the optional header Windows NT-specific fields, and the reserved entries of the data directory in the object header.

Resources are commonly used to house localizable strings and are sometimes used to house raw data or, on rare occasions, even executable code. Under different circumstances, it may be desirable or undesirable to include resources in the message digest. Resources may be omitted from the message digest to allow localization without the generation of new certificates. It may be desirable to include resources in the message digest if the resources are critical to an image file or application, despite the overhead of generating a certificate for each localized copy of the image. If resources are omitted from the message digest, the following information should not be included in the message digest calculation: resource table entry of the optional header data directory and the .rsrc section.

In a second embodiment, publisher signature 110 is incorporated or embedded in executable file 102 formatted as a Java class file, as defined in *The Java Virtual Machine Specification*, by Sun Microsystems Computer Corporation of Mountain View, Calif. This type of file also includes a file header with fields that identify selected information about the file. A Java class file consists of a stream of 8-bit bytes. All 16-bit and 32-bit quantities are constructed by reading in two or four 8-bit bytes, respectively. The bytes are joined together in network (big-endian) order, where the high bytes come first.

The class file format is described here using a structure notation. Successive fields in the structure appear in the external representation without padding or alignment. Variable size arrays, often of variable sized elements are called tables and are commonplace in these structures. The types u1, u2, and u4 mean respective unsigned one-, two-, or four-byte quantities. The top-level structure of a class file is represented as:

```
ClassFile
{
    u4          magic;
    u2          minor_version;
    u2          major_version;
    u2          constant_pool_count;
    cp_info     constant_pool[constant_poolcount - 1];
    u2          access_flags;
    u2          this_class;
    u2          super_class;
    u2          interfaces_count;
    u2          interfaces[interfaces_count];
    u2          fields_count
    field_info  fields[fields_count];
    u2          methods_count;
    method_info methods[methods_count];
    u2          attributes_count;
```

```
-continued
    attribute_info    attributes[attribute_count];
    }
```

```
GenericAttribute_info
    {
    u2        attribute_name;
    u4        attribute_length;
    u1        info[attribute_length];
    }
```

Attributes have the following semantics. The attribute_name is a 16-bit index into the class constant pool and the value of constant_pool[attribute_name] is a CONSTANT_Utf8 string giving the name of the attribute. The field attribute_length indicates the length of the subsequent information in bytes. This length does not include the six bytes of the attribute_name and attribute_length.

In accordance with this embodiment, a new attribute type is defined for containing a "signature block", a publisher signature 110 of the class file. The name of this attribute is "_digital_signature_". The information in this attribute is the signature block of the file, a PKCS #7 SignedData. To resolve any potential ambiguity, the last attribute with this name is considered the signature block. The constant pool entry corresponding to the signature block attribute, the one that contains the string "_digital_signature_", is the last constant pool entry of type CONSTANT_Utf8 and this value. And, the signature block attribute is the only reference in the file to this constant pool entry.

The sequence of bytes to be hashed or for which the message digest is calculated is the sequential contents of the class file as defined by the above ClassFile structure (specifically, therefore, with integers, etc., in big endian order), with the following omissions from the hash: (1) the constant_pool_count, (2) the attribute_count, (3) the last constant pool entry, if any, with type CONSTANT_Utf8 and value "_digital_signature_", (4) the entirety of the last attribute, if any, with the name "_digital_signature_", and (5) any "extra" bytes which may be in the file beyond the logical end of the .class file as defined by the above ClassFile structure. The first four omissions make the hash process invariant under the presence or absence of a digital signature in the class file. The fifth is simply a clarification of potential ambiguity.

To maintain the invariance of the hash, points 3) and 4) omit from the hash the information that the signing process adds to the file. Some variation on 1) and 2) is also needed, for the same reasons. An alternate design for 1) and 2) might be to include the two counts in the hash and to decrement them each by one in the case where the class file already contains a signature. This alternate design functions correctly, but necessitates that when hashing information at the start of the file one knows whether the file contains a signature or not, which can only be determined by looking at the attributes towards the end of the file. Omitting the two counts facilitates a one-pass computation of the hash value and does not create a potential security lapse.

Each constant pool entry and attribute is non-zero in size, and the nature of message-digest algorithms is that it is computationally infeasible to find any two distinct messages of any length that have the same message digest. PKCS #7 SignedDatas employ a similar omission of length bytes with no concern as to a potential attack.

If the message digest algorithm is known, the design presented here allows for a one-pass computation of the hash value except in a two cases. In the first case, there are two or more constant pool entries with type CONSTANT_Utf8 and value "_digital_signature_". When hashing the bytes of the constant_pool, performance-conscious implementations may assume that the first such entry will be the last and only entry, and backtrack and recompute the hash of the constant pool should this prove later in the pool to be in error. This case should happen only if the string constant "_digital_signature_" is in use by the class code itself, and is encoded in the constant pool as a CONSTANT_Utf8 instead of the alternate CONSTANT_Unicode representation. This can be avoided if compiler writers emit the string in the alternate CONSTANT_Unicode representation instead of CONSTANT_Utf8 when the constant value "_digital_signature_" is used by class code.

In the second case, there are two or more attributes with the name "_digital_signature_". When hashing the attributes, performance-conscious implementations may assume that the first such attribute will be the last and only such attribute, and backtrack and recompute the hash of the attributes should this prove later in the list to be in error. It is expected that this case is unlikely to happen in practice.

To facilitate one-pass processing of the verification of the signatures of .class files, a preferential hash algorithm (e.g., MD5) may be used to sign .class files. Performance-conscious implementations may wish to assume this, computing the hash of the file accordingly, but backtracking and rehashing the file should it be determined (when decoding the PKCS #7 Signed-Data) that a different or additional algorithm is required to verify the signature. The digest algorithms used are indicated inside the PKCS #7 Signed-Data in the standard way according to the definition of that data type.

A signature block is a block of data in the format of a SignedData as defined by PKCS #7: Cryptographic Message Syntax Standard, with enhancements for signing Java class files. Parts of the PKCS #7 specification are summarized for explanation of the extensions. The SignedData format, like all of the PKCS standard data formats, are defined using the ASN.1 Abstract Syntax Notation as defined by the ITU-T. The ASN.1 abstract syntax specification specifies a stream of bytes by the application of the ASN.1 "Basic Encoding Rules" or "Distinguished Encoding Rules" as appropriate. (PKCS #7 actually uses the 1988 ASN.1 syntax, rather than its equivalent 1994 ASN.1 syntax presented here.) The ASN.1 for a SignedData is specified by PKCS #7 as:

```
SignedData ::=SEQUENCE {
version           Version,
digestAlgorithms  DigestAlgorithmIdentifiers
contentInfo       ContentInfo,
certificates      [0] IMPLICIT ExtendedCertificatesAndCertificates
                      OPTIONAL,
crls              [1] IMPLICIT CertificateRevocationLists OPTIONAL,
signerInfos SignerInfos }
```

The contentInfo field contains the content data to be signed. The zero or more signerInfos contain the signature or signatures on that data. The set of certificates in ExtendedCertificatesAndCertificates are intended to be sufficient to contain chains from a recognized "root" or "top-level certification authority" to all of the signers in the signerInfos field, though this is not required. There may be fewer or more certificates than are necessary. ContentInfo is defined by PKCS #7 as:

```
CONTENTINFO ::= CLASS {
  &Type,
  &id                    OBJECT IDENTIFIER UNIQUE
}
WITH SYNTAX {
  WITH SYNTAX &Type
  ID                     &id
}
ContentInfo ::= SEQUENCE {
  contentType      CONTENTINFO.&id,
  content          [0] EXPLICIT CONTENTINFO.&Type OPTIONAL
}
```

The design presented in PKCS #7 has the actual content contained physically inside the ContentInfo. To refer in the ContentInfo to an external data source, a new ContentInfo type is defined called IndirectDataContent. An IndirectDataContent contains: 1) an indication of the kind of data to be hashed. This is an object identifier; thus, new kinds of indirect data can be independently created. 2) Optionally, an indication of the actual data to be hashed. This is specified in a syntax governed by the object identifier. Commonly this is a file name, a URL, etc., along with any additional parameters needed that indicate which specific sub-part of the indicated data is involved. If this indication is absent, then the actual data to be hashed is located implicitly in an object-identifier-specific means, such as the file in which the IndirectDataContent is physically located. (For Java class files, this indication is typically omitted, indicating that the indicated data is the containing class file.) 3) A digest of the indicated data, along with an indication of the digest algorithm used. This digest/digest algorithm pair is then itself digested and signed as part of the signing process of the SignedData per PKCS #7, thus, indirectly, associating a digital signature with the indicated data.

The definition of IndirectDataContent and related structures is as follows:

```
indirectDataContent CONTENTINFO ::= {
  WITH SYNTAX   IndirectDataContent
  ID            id-indirectdata
}
IndirectDataContent ::= SEQUENCE {
  data            AttributeTypeAndOptionalValue,
  messageDigest   DigestInfo — DigestInfo defined in PKCS #1
}
AttributeTypeAndOptionalValue ::= SEQUENCE {
  type            ATTRIBUTE.&id,
  value           ATTRIBUTE.&Type ({. . .}{@type}) OPTIONAL
}
id-indirectdata OBJECT IDENTIFIER ::= (value to be supplied)
javaClassFileSourceType ATTRIBUTE ::= {
  WITH SYNTAX   JavaClassFileData
  ID            id-indirectdata-javaClassFile
}
id-indirectdata-javaclassFiled OBJECT IDENTIFIER ::= (value to be supplied)
JavaClassfileData ::= Link
Link ::= CHOICE {
  url           [0] IMPLICIT UniformResourceLocator,
  moniker       [1] IMPLICIT SerializedMoniker,
  file          [2] IMPLICIT FileName
}
UniformResourceLocator ::= IA5String
FileName ::= DcmiString
SerializedMoniker ::= SerializedObject
— A 'moniker' is a term from OLE. It is a 'persistentable, intelligent
— name'. See the OLE Component Object Model specification for more info
SerializedObject ::= SEQUENCE {
  classid            Uuid,
  serializedData OCTET STRING — format determined by classid
}
Uuid ::= OCTET STRING (SIZE(16..16)) — an OSF UUID
Dcmistring ::= CHOICE {
  unicode       [0] IMPLICIT BMPString,
  ascii         [1] IMPLICIT IA5String
}
```

Figure 10:
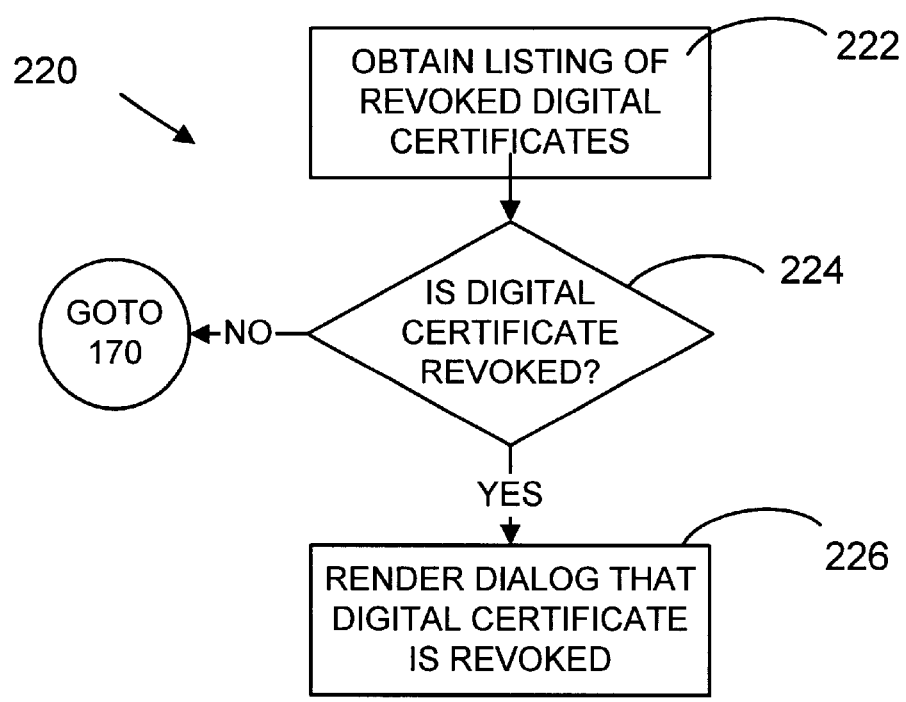
FIG. 10 is a flow diagram of a digital certificate revocation method.

FIG. 10 is a flow diagram of a digital certificate revocation method 220 that minimizes or eliminates the potential for harm that can be caused by compromised digital certificates. Method 220 would be performed in the interim between determining that the digital certificate is valid in accordance with decision block 168 and the rendering of the digital certificate dialog in accordance with process block 170 of method 150 (FIG. 6).

Process block 222 indicates that a listing of revoked digital certificates is obtained by or downloaded to the user's or recipient's receiving computer. The listing may be obtained or updated on a regularly scheduled basis (e.g., daily) so it is substantially current whenever the user downloads executable file 152. It will be appreciated that the listing will include only digital certificates that have been revoked and have not yet expired. As a result, publisher license expiration date 128 (FIG. 4) and agency license expiration date 196 (FIG. 8) provide the additional benefit of preventing the revocation listing from growing indefinitely and thereby becoming unworkably large.

To further reduce the size of the revocation listing so it can be downloaded frequently with minimal network bandwidth and storage requirements, a secure hash (e.g., MD5) of the listing can be delivered. This prevents casual inspection of the revoked digital certificates, which increases privacy and security for the revocation listing. There is a risk of false revocation due to hash collisions, but the probability of this is extraordinarily minuscule for hash functions such as MD5. The revocation listing may be in the form of the following database table, except that the actual licenses being revoked would not be transmitted to users.

TABLE 10

| Column Name | Type | Description |
| --- | --- | --- |
| SequenceNumber | DWORD | A counter. Each revoke or unrevoke operation is given a forever-unique tag. |
| RevokeUnrevoke | BOOLEAN | True if revoking, false if unrevoking |
| LicExpDate | DATE | The expiration date of the license (cached from the license itself) |
| HashLicense | BYTE[128] | The MD5 hash of the license |
| License | BLOB | The actual license being revoked |

Decision block 224 indicates that an inquiry is made as to whether the digital certificate is included in a listing of revoked digital certificates. Decision block 224 proceeds to process block 226 whenever the digital certificate is included in the revocation listing and otherwise proceeds to process block 170 (FIG. 6).

Process block 226 indicates that a dialog is rendered indicating that the digital certificate has been revoked and asking the user whether or not to run the program file.

Digital certificates would typically be revoked by the agency or meta-agency that issued them. The database of revoked digital certificates would also include a table by which different agencies and meta-agencies post and administer the revocation of digital certificates.

TABLE 11

| Column Name | Description |
| --- | --- |
| AccountInfo | The database account under which this licensee is allowed to exercise his revocation & granting rights. |
| License | The license of an agency or meta agency. |
| IsMetaAgency | Whether the agency is a meta agency or not. Cached from the license itself. |

The indication of whether the revoking agency is a meta-agency is optional. Each agency or meta-agency has the right to revoke licenses that it directly issued. That is, it can revoke licenses for which its license is the penultimate link in the certification chain.

The function of Table 11 is to confirm whether an instruction to revoke or unrevoke a license is authorized. The database looks up the agency's credentials in the AccountInfo column, obtaining from that the corresponding license that indicates which licenses or digital certificates this agency is allowed to revoke or unrevoke. Each meta-agency has the right to grant revocation rights to child agencies that it directly licenses. As a result, the right to populate this second table is controlled by other entries in the same table.

In one implementation, a software publishing trust provider module handles specified actions under a WinVerifyTrust() function included in the Win32 application programming interface (API) set from Microsoft Corporation and verifies the trustability of software components by interpreting local system rules and analyzing cryptographic material associated with those software components. The caller (i.e., application calling the WinVerifyTrust() function) specifies the trust provider that evaluates the subject according to the action requested.

The software publishing trust provider module allows users to install any software desired on their systems, but requires user interaction prior to installation of software not determined to be trustable by the available cryptographic material. The trust provider makes use of X.509 version 3 certificates and PKCS #7 digital signature structures, as described above.

The software publishing trust provider module is called by using the Win32 API WinVerifyTrust() function, which has the following prototype:

```
HRESULT
WINAPI
WinVerifyTrust(
    HWND        hwnd,
    DWORD       dwTrustProvider,
    DWORD       dwActionID,
    LPVOID      ActionData,
);
```

The Software Publishing trust provider is identified by the WINBASE.H constant:

define WIN_TRUST_SOFTWARE_PUBLISHER

Calls where this value is passed for the dwTrustProvider parameter are handled by the Software Publishing trust provider. The trust provider supports two actions (passed in the dwActionID parameter), defined as:

define WIN_SPUB_ACTION_TRUSTED_PUBLISHER define WIN_SPUB_ACTION_PUBLISHED_SOFTWARE

In one implementation, the software publishing trust provider is also the system default provider for these actions. Therefore, if the caller specifies in the dwTrustProvider the constant:

define WIN_TRUST_PROVIDER_UNKNOWN and the action is either of those defined above, the call will also be handled by this trust provider. This is the calling method that most applications will employ, because it allows later system configuration options, which permit system or network administrators to assign various more-or-less stringent trust providers to handling these actions, without requiring modification to the applications.

The parameters for the WinVerifyTrust() function are:

| Parameter | Description |
| --- | --- |
| hwnd | Normally, every attempt is made to make trust decisions without the aid of an interactive user. However, situations may arise where trust can be more accurately determined with user approval or decision. This parameter is used to indicate whether an interactive user is available to assist in any trust decisions. If this value is passed as INVALID_HANDLE_VALUE, then no user interface (UI) will be presented and some default decision will be made without a user's assistance. If this value is set to any other value, then it is assumed that there is an interactive user available. If the value is zero (0), then the caller's desktop will be used for any UI. Any other value is assumed to be the HWND of a calling user's window. |
| DwTrustProvider | Specifies which trust provider is to be utilized to answer the question of trust. This value establishes what the remaining parameter values mean. Values defined for dwTrustProvider are:<br>#define WIN_TRUST_PROVIDER_UNKNOWN 0x000000<br>#define WIN_TRUST_SOFTWARE_PUBLISHER 0x00000 |
| dwActionID | Specifies what the trust provider is being asked to verify. Each trust provider supplies its own set of trust actions. |
| ActionData | This parameter is used to pass information required by the trust provider, including data about the level of trust required or context for the trust decision and, where applicable, information about the subject being verified. The meaning and format of the information passed via this parameter is dependent upon the action specified in the dwActionID parameter. |

This service dispatches the specified ActionData information to the selected trust provider for trust evaluation. If the trust provider specified is WIN_TRUST_PROVIDER_UNKNOWN, then the system will select an appropriate trust provider for the action specified by the dwActionID parameter, or return the error TRUST_E_PROVIDER_UNKNOWN if no trust provider that supports that action is installed.

This function returns an HRESULT indicating the results of the trust inquiry. STATUS_SUCCESS (or ERROR_SUCCESS) indicates that the subject information provided in the ActionData parameter is trusted for the specified action. The function may return one of the standard return values defined below, or a trust provider specific value.

If a value other than STATUS_SUCCESS is returned, then the subject is either not trusted, or is trusted with some caveats. These caveats, if any, are specified by trust provider specific return codes and would be documented with each trust provider. The standard error return codes are:

| Status Code | Meaning |
| --- | --- |
| TRUST_E_SUBJECT_NOT_TRUSTED | The subject is not trusted for the specified action. Most trust providers will return a more detailed error code than this when trust is not provided, but in some cases this undescriptive value may be returned. |
| TRUST_E_PROVIDER_UNKNOWN | The specified trust provider is not known on this system. |
| TRUST_E_ACTION_UNKNOWN | The trust verification action specified is not supported by the specified trust provider. |
| TRUST_E_SUBJECT_FORM_UNKNOWN | The form specified for the subject is not one supported or known by the specified trust provider. |

The definition of the ACTIONDATA structure may be common among trust providers or a trust provider may define specific ACTIONDATA structures it supports. Common ACTIONDATA structures are described below.

Many trust providers will require only minimal context data for trust evaluation. They derive most of the information needed for trust decisions directly from a subject. The subject is a data stream which is to be validated by the WinVerifyTrust() call. Some ACTIONDATA structures are used by several trust providers and they are described independent of them. The following ACTIONDATA data structures are defined:

```
typedef LPVOID WIN_TRUST_SUBJECT
typedef struct_WIN_TRUST_ACTDATA_CONTEXT_WITH_SUBJECT {
  HANDLE   hClientToken;
  DWORD    dwSubjectType;
  WIN_TRUST_SUBJECT Subject;
} WIN_TRUST_ACTDATA_CONTEXT_WITH_SUBJECT,
*LPWIN_TRUST_ACTDATA_CONTEXT_WITH_SUBJECT
typedef struct_WIN_TRUST_ACTDATA_SUBJECT_ONLY {
  DWORD    dwSubjectType;
  WIN_TRUST_SUBJECT Subject;
} WIN_TRUST_ACTDATA_SUBJECT_ONLY,
*LPWIN_TRUST_ACTDATA_SUBJECT_ONLY
```

Within these data structures, the format of the subject data is specified by the value of the dwSubjectType field. The hClientToken parameter in the WIN_TRUST_ACTDATA_CONTEXT_WITH_SUBJECT structure is used to pass a handle to the security context of the calling application. A trust provider may use the security context when evaluating trust of the subject.

Subject types describe formats of the data stream being validated by a WinVerifyTrust() call. The subject types are specified independent of specific trust providers. Multiple trust providers may share a common implementation to extract trust material from these subject formats and digest the relevant portions of the data stream. This separation allows trust providers to verify the trustworthiness of a data stream of a given format, without building knowledge of subject formats into each trust provider. Instead, trust providers share other common components (that are also trusted software) to interpret the data stream. Subject types defined in WINBASE.H, which are valid values for the dwSubjectType field of the ACTIONDATA structures defined above, include:

define WIN_TRUST_SUBJTYPE_RAW_FILE define WIN_TRUST_SUBJTYPE_PE_IMAGE define WIN_TRUST_SUBJTYPE_OLE_STORAGE

For all of these subject types, the same data structure is required in the Subject parameter of the ACTIONDATA structures. This structure is:

typedef struct_WIN_TRUST_SUBJECT_FILE {

HANDLE hFile;

LPCWSTR IpPath;

} WIN_TRUST_SUBJECT_FILE, *LPWIN_TRUST_SUBJECT_FILE;

The hFile element of the structure is optional. If hFile is provided, trust providers are expected to use this file handle to read the subject as a performance optimization. If hFile is set to the value INVALID_HANDLE_VALUE (defined in WINBASE.H) then the trust provider will open the subject using the IpPath field.

The IpPath element of this structure is mandatory and includes the path of the subject being verified. The string may be used for the purpose of opening the file to read it, and optionally for prompting the user for additional information about the file.

The caller may specify both fields in the structure, but provide a different string for IpPath than was used to obtain the HFILE handle. The IpPath string is not validated to ensure consistency with the open handle or the name that the subject may "expect" to have. This gives the caller the option of storing a subject data stream under a temporary name during the trust verification phase, and presenting the original file path in any user interface dialog.

When the WIN_SPUB_ACTION_PUBLISHED_SOFTWARE action is invoked, the subject is inspected to see if it contains a PKCS #7 signed data structure. If it does, the structure is expected to contain a chain of X.509 certificates. In this development release, a root certificate must be present that is a self-signed certificate containing a root public key and is signed by the root private key. Additionally, a certificate must be present that is signed by the root private key and identifies a software publishers public key. Finally, the PKCS #7 signed data structure must contain an ExternalData signed attribute that contains a digest of the subject being verified.

If these conditions are met, the API returns SUCCESS to the calling application. Otherwise, if an HWND was provided, a user interface is displayed providing information obtained from any valid certificates present that contains the path of the subject file. If the user confirms acceptance of the file, the API also returns SUCCESS; if the user does not confirm acceptance, returns a distinguished error code.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a local computer system, a method of digitally signing an executable file for distribution over a network from the local computer system to a remote computer system by performing a calculation on contents of the executable file at the local computer system, wherein the executable file is of an executable file format defining a plurality of fields, wherein at least one field has a value modifiable to add a new section elsewhere in the executable file and is designated in the calculation at the local computer system as excluded when performing the calculation to generate a digital signature for the executable file, the method comprising:

generating the digital signature for the executable file at the local computer system by performing the calculation on at least one of the plurality of fields, excluding the field having a value modifiable to add a new section elsewhere in the executable file and designated in the calculation at the local computer system as excluded when performing the calculation to generate a digital signature for the executable file out of the fields from the calculation;

adding a new section to the executable file at the local computer system by modifying the value of the field having a value modifiable to add a new section elsewhere in the executable file and designated in the calculation at the local computer system as excluded when performing the calculation to generate a digital signature for the executable file; and at the local computer system, placing the digital signature in the new section to embed the digital signature in the executable file.

2. A computer-readable medium having computer-executable instructions for performing the method recited in claim 1.

3. The method of claim 1 wherein the executable file comprises an attributes-count field, the attributes-count field indicative of how many attributes are in the executable file;

the designated field having a value modifiable to add a new section elsewhere in the executable file is the attributes-count field;

said adding increments the attributes-count field to add a new attribute to the executable file, wherein the new section comprises the new attribute; and said placing places the digital signature into the new attribute of the executable file.

4. The method of claim 1 wherein said generating calculates a hash for the executable file, excluding the designated field having a value modifiable to add a new section elsewhere in the executable file from the hash.

5. In a local computer system, a method of digitally signing an executable file for distribution over a network from the local computer system to a remote computer system by performing a calculation on contents of the executable file at the local computer system, wherein the executable file is of an executable file format defining a header having a plurality of fields and accommodating modification of a value of a header field in the header to add a new section to the executable file, wherein the header field is designated in the calculation at the local computer system as excluded when performing the calculation to generate a digital signature for the executable file, the method comprising:

generating the digital signature for the executable file at the local computer system by performing the calculation on at least a portion of the executable file outside the header and at least a portion of the header, excluding the designated header field out of the fields in the header from the calculation;

adding a new section to the executable file at the local computer system by modifying the value of the designated header field; and at the local computer system, placing the digital signature in the section to embed the digital signature in the executable file;

wherein the generating step calculates a hash for the executable file, excluding the designated header field from the hash;

wherein the generating step further excludes information for localizing the executable file from the hash.

6. In a local computer system, a method of digitally signing an executable file for distribution over a network from the local computer system to a remote computer system by performing a calculation on contents of the executable file at the local computer system, wherein the executable file is of an executable file format defining a header having a plurality of fields and accommodating modification of a value of a header field in the header to add a new section to the executable file, wherein the header field is designated in the calculation at the local computer system as excluded when performing the calculation to generate a digital signature for the executable file, the method comprising:

generating the digital signature for the executable file at the local computer system by performing the calculation on at least a portion of the executable file outside the header and at least a portion of the header, excluding the designated header field out of the fields in the header from the calculation;

adding a new section to the executable file at the local computer system by modifying the value of the designated header field; and at the local computer system, placing the digital signature in the section to embed the digital signature in the executable file;

wherein the generating step calculates a hash for the executable file, excluding the designated header field from the hash;

wherein the generating step further excludes information for debugging the executable file from the hash.

7. In a computer system, a method of digitally signing an executable file comprising a plurality of constants in a constant pool, a constant-pool-count field indicating how many constants are in the constant pool and incrementable to add a new constant to the constant pool, a plurality of attribute-info fields, and an attributes-count field indicating how many attribute-info fields are in the file and incrementable to add a new attribute-info field, the method comprising:

generating a hash for the file, excluding from the hash the constant-pool-count field incrementable to add a new constant to the constant pool and the attributes-count field incrementable to add a new attribute-info field, including in the hash at least one of the attribute-info fields and at least one of the constants in the constant pool;

encrypting the hash to form part of a digital signature;

adding a new attribute-info field labeled as a digital signature to the attribute-info fields by performing the steps:

(a) incrementing the constant-pool-count field incrementable to add a new constant to the constant pool, wherein the constant-pool-count field is excluded from the hash;

(b) placing a constant indicative of a digital signature in the constant pool;

(c) incrementing the attributes-count field incrementable to add a new attribute-info field, wherein the attributes-count field is excluded from the hash; and (d) storing a reference to the constant indicative of a digital signature in the new attribute-info field added by incrementing the constant-pool-count field; and placing the digital signature in the new attribute-info field added by incrementing the attributes-count to embed the digital signature in the executable file.

8. A computer-readable medium having computer-executable instructions for performing the steps recited in claim 7.

9. In a first computer system, a method of confirming a digital signature embedded in an executable file, wherein the executable file comprises a plurality of elements, and a number-of-elements field, the number-of-elements field indicative of how many elements are in the file, wherein one of the elements serves as a digital signature for the executable file, the method comprising:

generating calculated identifying information by performing a calculation on a set of fields and elements in the executable file, excluding the number-of-elements field and the element serving as the digital signature from the calculation, including in the calculation at least one of the plurality of elements;

extracting, from the digital signature, provided identifying information having been generated by performing the calculation on a same set of fields and elements in the executable file at a second computer system, wherein the calculation performed at the second computer system excluded the number-of-elements field and the element serving as the digital signature from the calculation and included in the calculation at least one of the plurality of elements; and comparing the provided identifying information with the calculated identifying information to determine whether the digital signature is valid.

10. A computer-readable medium having computer-executable instructions for performing the steps recited in claim 9.

11. The method of claim 9 wherein the generating step calculates a hash for the file, excluding the number-of-elements field and the element serving as the digital signature from the hash; and the comparing step determines the digital signature is valid if the provided identifying information and the calculated identifying information are identical.

12. The method of claim 11 wherein the file further comprises an encrypted hash and an encrypted publisher key, the method further comprising:

decrypting the encrypted publisher key with a remotely-available agency key to provide an unencrypted publisher key;

decrypting the encrypted hash with the unencrypted publisher key to provide an unencrypted hash serving as the provided identifying information.

13. The method of claim 11 wherein the file is of the Common Object File Format and comprises a CertificateTable field and a certificate table;

the elements are certificates in the file referenced by the certificate table;

the certificate table is of a size indicated by the CertificateTable field;

the number-of-elements field is in the CertificateTable field;

the element serving as the digital signature is a certificate referenced by the certificate table; and the generating step further excludes the certificate table from the hash.

14. In a first computer system, a method of confirming a digital signature embedded in an executable file, wherein the executable file comprises a header comprising a plurality of fields, a plurality of elements, and a number-of-elements field in the header, the number-of-elements field indicative of how many elements are in the file, wherein one of the elements serves as a digital signature, the method comprising:

generating calculated identifying information by performing a calculation on a portion of the executable file, excluding the number-of-elements field and the element serving as the digital signature from the calculation, including in the calculation at least one field from the header;

extracting, from the digital signature, provided identifying information having been generated by performing the calculation on the portion of the executable file at a second computer system; and comparing the provided identifying information with the calculated identifying information to determine whether the digital signature is valid;

wherein the generating step calculates a hash for the file, excluding the number-of-elements field and the element serving as the digital signature from the hash; and the comparing step determines the digital signature is valid if the provided identifying information and the calculated identifying information are identical;

wherein the file is of the Common Object File Format and comprises a CertificateTable field and a certificate table;

the elements are certificates in the file referenced by the certificate table;

the certificate table is of a size indicated by the CertificateTable field;

the number-of-elements field is in the CertificateTable field;

the element serving as the digital signature is a certificate referenced by the certificate table; and the generating step further excludes the certificate table from the hash;

wherein the file comprises a resource table; and the generating step further excludes the resource table from the hash.

15. In a computer system, a method of confirming a digital signature embedded in a file of a Java class file format, wherein the file comprises a plurality of constants in a constant pool, a constant-pool-count field, the constant-pool-count field indicative of how many constants are in the constant pool and incrementable to add a new constant to the constant pool, a plurality of fields defining a set of attributes, and an attributes-count field, the attributes-count field indicative of how many attributes are in the file and incrementable to add a new attribute to the set of attributes, wherein one of the attributes in the set of attributes serves as a digital signature and one of the constants in the constant pool is a constant labeling a digital signature, the method comprising:

extracting a first hash from the attribute serving as a digital signature;

calculating a second hash for the file, excluding the constant labeling a digital signature, the constant-pool-count field incrementable to add a new constant to the constant pool, the attribute serving as a digital signature, and the attributes-count field incrementable to add a new attribute to the set to the set of attributes from the second hash, including at least one of the attributes in the set of attributes in the second hash; and comparing the first hash and the second hash to determine if the first hash is identical to the second hash, thereby determining whether the file has been modified since it was signed with the digital signature.

16. The method of claim 15 wherein the extracting step comprises:

decrypting an encrypted key residing in the file to generate an decrypted key; and decrypting an encrypted hash residing in the file with the decrypted key to provide the first hash.

17. A method of distributing an executable file, wherein the executable file comprises a plurality of elements and a number-of-elements field indicative of how many elements are in the file and incrementable to add a new element to the file, the method comprising:

at a first computer, performing the steps:
(a) generating a digital signature for the executable file by calculating a first hash for the executable file, excluding the number-of-elements field incrementable to add a new element to the file from the first hash, and including at least one of the plurality of elements in the first hash;
(b) adding a digital signature element to the executable file by incrementing the number-of-elements field incrementable to add a new element to the file, wherein the number-of-elements field was excluded when generating the digital signature for the executable file; and
(c) placing the digital signature in the digital signature element added by incrementing the number-of-elements field to embed the digital signature in the executable file; and at a second computer, performing the steps:
(d) calculating a second hash for the executable file, excluding the number-of-elements field and the digital signature element from the second hash, and including the at least one of the plurality of elements in the second hash;
(e) extracting the first hash from the digital signature element; and
(f) comparing the first hash with the second hash to determine whether the executable file was modified after the digital signature was embedded therein.

18. The method of claim 1 further comprising:
labeling the new section with an identifier recognized at the remote computer system as a section to be excluded at the remote computer system from calculations verifying the embedded digital signature.

19. The method of claim 3 wherein the executable file is of a file format for Java class files.

20. The method of claim 7 further comprising:
labeling the new attribute-info field with an attribute name recognized at a remote computer system as an attribute to be excluded from calculations verifying the embedded digital signature at the remote computer system.

21. The method of claim 15 wherein the calculating step calculates the second hash for the file using a one pass technique, visiting each field in the file and included in the second hash exactly once to calculate the second hash.

22. The method of claim 15 wherein the calculating step further includes in the second hash the attributes-count field decremented by one and the constant-pool-count field decremented by one.

23. The method of claim 15 further comprising:
determining whether the file contains a signature; wherein the calculating step further includes in the second hash the attributes-count field decremented by one and the constant-pool-count field decremented by one when it is determined that the file contains a signature.

24. In a computer system, a method of performing hash calculations to generate a hash value for a file to ensure hash invariance irrespective of the presence of a signature in the file, wherein the file comprises a plurality of fields and a set of a plurality of elements, at least one of the fields tracking how many elements are in the set and incrementable to add an element to the set of a plurality of elements, the method comprising:

to generate the hash value for the file, performing a hashing function on at least one of the plurality of fields during hash calculations;

to generate the hash value for the file, performing a hashing function on at least one of elements in the set of a plurality of elements during hash calculations;

when generating the hash value for the file, excluding from hash calculations the at least one of the fields tracking how many elements are in the set and incrementable to add an element to the set of a plurality of elements; and when generating the hash value for the file, excluding from hash calculations an element in the set of a plurality of elements tagged as a digital signature element, if any.

25. The method of claim 24 wherein
the file is of a Java class format comprising a constant pool;
the at least one of the fields tracking how many elements are in the set and incrementable to add an element to the set of a plurality of elements is an attributes-count field; and
the element in the set of a plurality of elements tagged as a digital signature element, if any, is tagged using a constant in the constant pool.

26. The method of claim 4 wherein said generating further excludes information for localizing the executable file from the hash.

27. The method of claim 7 wherein said generating further excludes information for localizing the executable file from the hash for the file.

28. The method of claim 1 wherein said generating produces a hash for the executable file, wherein the executable file is published by a publisher and certified by a certification agency, wherein the publisher has a publisher's private key and a publisher's public key corresponding to the publisher's private key and the certification agency has an agency's private key and an agency's public key corresponding to the agency's private key, the method further comprising:

generating a publisher's digital certificate comprising the hash encrypted with the publisher's private key;

generating an agency's digital certificate comprising the publisher's public key encrypted with the agency's private key;

wherein the hash can be retrieved from the publisher's digital certificate by decrypting the encrypted publisher's public key with the agency's public key and decrypting the encrypted hash with the decrypted publisher's public key.

* * * * *

UNITED STATES PATENT AND TRADEMARK OFFICE
CERTIFICATE OF CORRECTION

PATENT NO. : 6,367,012 B1
DATED : April 2, 2002
INVENTOR(S) : Atkinson et al.

It is certified that error appears in the above-identified patent and that said Letters Patent is hereby corrected as shown below:

<u>Title Page,</u>
Item [56], OTHER PUBLICATIONS, "http://swissnet.ai.mit.edu/~jbank/javapaper.htnl/22" should read -- http://swissnet.ai.mit.edu/~jbank/javapaper/javapaper.html --.

<u>Column 13,</u>
Line 26, "referred" should read -- preferred --.
Line 38, "DEBGUG" should read -- DEBUG --.

<u>Column 14,</u>
Line 67, "NT" should read -- NT™ --.

<u>Column 17,</u>
Line 17, "NT)" should read -- NT™) --.
Line 33, "NT" should read -- NT™ --.

<u>Column 19,</u>
Lines 12 and 13, "debug" should read -- .debug --.

<u>Column 20,</u>
Line 3, "debug" should read -- .debug --.
Line 49, "class" should read -- .class --.
Line 58, "poolcount" should read -- pool_count --.

<u>Column 21,</u>
Line 7, before the heading "GenericAttribute_info", the following should appear:
-- Attributes have the following format: --.
Lines 24, 36, 47 and 54, "class" should read -- .class --.

<u>Column 22,</u>
Line 3, "except in a two cases" should read -- except in two cases --.
Lines 58-59, after "signerInfos SignerInfos}" the following should appear:
-- DigestAlgorithmIdentifiers ::=SET OF DigestAlgorithmIdentifier
SignerInfos ::=SET OF SignerInfo --.

UNITED STATES PATENT AND TRADEMARK OFFICE
CERTIFICATE OF CORRECTION

PATENT NO. : 6,367,012 B1
DATED : April 2, 2002
INVENTOR(S) : Atkinson et al.

It is certified that error appears in the above-identified patent and that said Letters Patent is hereby corrected as shown below:

Column 23,
Line 67, "class" should read -- .class --.

Signed and Sealed this

Eleventh Day of March, 2003

JAMES E. ROGAN
*Director of the United States Patent and Trademark Office*